(12) United States Patent
Namgoong et al.

(10) Patent No.: US 10,411,782 B2
(45) Date of Patent: Sep. 10, 2019

(54) CHANNEL ESTIMATION FOR PER-TONE CONTINUOUS PRECODING IN DOWNLINK MIMO TRANSMISSION

(71) Applicant: QUALCOMM Incorporated, San Diego, CA (US)

(72) Inventors: June Namgoong, San Diego, CA (US); Alexandros Manolakos, San Diego, CA (US); Joseph Binamira Soriaga, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 15/469,806

(22) Filed: Mar. 27, 2017

(65) Prior Publication Data
US 2017/0288759 A1 Oct. 5, 2017

Related U.S. Application Data

(60) Provisional application No. 62/316,419, filed on Mar. 31, 2016.

(51) Int. Cl.
*H04B 17/364* (2015.01)
*H04B 7/06* (2006.01)
(Continued)

(52) U.S. Cl.
CPC ......... *H04B 7/0639* (2013.01); *H04B 7/0408* (2013.01); *H04B 7/0456* (2013.01);
(Continued)

(58) Field of Classification Search
CPC ....... H04B 17/364; H04B 1/69; H04W 24/02; H04L 5/0053
(Continued)

(56) References Cited

U.S. PATENT DOCUMENTS 6,879,639 B1 * 4/2005 Verbin .............. H04L 25/03343 375/285
7,197,084 B2 * 3/2007 Ketchum ............... H04B 7/005 375/295

(Continued)

FOREIGN PATENT DOCUMENTS

WO 2010040190 A1 4/2010

OTHER PUBLICATIONS

International Search Report and Written Opinion—PCT/US2017/024607—ISA/EPO—dated Jun. 12, 2017.
(Continued)

*Primary Examiner* — James M Perez
(74) *Attorney, Agent, or Firm* — Arent Fox LLP

(57) ABSTRACT

In an aspect of the disclosure, a method, a computer-readable medium, and an apparatus are provided. The apparatus may be a UE. The apparatus may receive a transmission over a precoded channel. The transmission may include a layer having a plurality of symbols, each symbol having a plurality of modulated tones precoded on a per-tone basis. The receive layer may be associated with a power delay profile. The apparatus may estimate the precoded channel based on a time support of the power delay profile.

26 Claims, 18 Drawing Sheets

(51) Int. Cl.

| | |
|---|---|
| *H04B 7/0456* | (2017.01) |
| *H04L 1/00* | (2006.01) |
| *H04L 5/00* | (2006.01) |
| *H04W 52/02* | (2009.01) |
| *H04W 52/04* | (2009.01) |
| *H04W 52/26* | (2009.01) |
| *H04B 7/0408* | (2017.01) |
| *H04B 7/08* | (2006.01) |
| *H04L 25/02* | (2006.01) |
| *H04L 25/03* | (2006.01) |

(52) U.S. Cl.
CPC ......... *H04B 7/0486* (2013.01); *H04B 7/0842* (2013.01); *H04L 1/0015* (2013.01); *H04L 1/0031* (2013.01); *H04L 5/005* (2013.01); *H04L 5/0017* (2013.01); *H04L 5/0023* (2013.01); *H04L 25/0204* (2013.01); *H04L 25/0212* (2013.01); *H04L 25/0224* (2013.01); *H04L 25/03891* (2013.01); *H04W 52/0258* (2013.01); *H04W 52/04* (2013.01); *H04W 52/262* (2013.01); *Y02D 70/1242* (2018.01); *Y02D 70/1262* (2018.01); *Y02D 70/142* (2018.01); *Y02D 70/146* (2018.01); *Y02D 70/444* (2018.01)

(58) Field of Classification Search
USPC .............. 375/130–153, 259–285, 295–352
See application file for complete search history.

(56) References Cited

U.S. PATENT DOCUMENTS

| | | | | |
|---|---|---|---|---|
| 7,200,180 | B2* | 4/2007 | Verbin | H04L 25/03057 375/261 |
| 7,586,974 | B2* | 9/2009 | Khayrallah | H04B 1/7117 375/140 |
| 7,609,786 | B2* | 10/2009 | Keerthi | H04L 25/0248 375/130 |
| 7,787,520 | B2* | 8/2010 | Kent | H04L 25/0204 342/174 |
| 7,894,507 | B2* | 2/2011 | Kent | H04L 25/0204 375/144 |
| 7,974,349 | B2* | 7/2011 | Nam | H04B 7/0452 375/259 |
| 7,983,323 | B2* | 7/2011 | Kent | H04B 1/7115 375/148 |
| 8,098,776 | B2* | 1/2012 | Kent | H04B 7/0697 375/141 |
| 8,233,517 | B2* | 7/2012 | Grant | H04B 7/0632 375/144 |
| 8,259,865 | B2* | 9/2012 | Krishnamoorthi | H04L 25/0202 370/272 |
| 8,305,942 | B2* | 11/2012 | Hart | H04L 25/0204 370/281 |
| 8,339,977 | B2* | 12/2012 | Wild | H04B 7/0417 370/252 |
| 8,411,780 | B2* | 4/2013 | Jonsson | H04B 7/0413 375/267 |
| 8,428,106 | B2* | 4/2013 | Cairns | H04B 1/712 375/142 |
| 8,437,436 | B2* | 5/2013 | Park | H04L 25/0202 375/231 |
| 8,509,710 | B2* | 8/2013 | Kim | H04B 7/0671 375/299 |
| 8,543,070 | B2* | 9/2013 | Howard | H04B 7/0421 370/344 |
| 8,660,196 | B2* | 2/2014 | Schwager | H04B 3/50 375/259 |
| 8,737,546 | B2* | 5/2014 | Zhengang | H04L 25/022 375/260 |
| 8,798,117 | B1* | 8/2014 | Campbell | H04B 7/0814 375/148 |
| 8,825,069 | B2* | 9/2014 | Koivisto | H04L 25/0224 455/452.1 |
| 9,020,049 | B2* | 4/2015 | Schwager | H04B 3/50 375/257 |
| 9,215,694 | B2* | 12/2015 | Chen | H04W 72/04 |
| 9,338,031 | B2* | 5/2016 | Zhang | H04B 1/7107 |
| 9,344,162 | B2* | 5/2016 | Goldsmith | H04B 7/0413 |
| 9,509,469 | B2* | 11/2016 | Cheng | H04L 5/0048 |
| 9,621,389 | B2* | 4/2017 | Nagalpur | H04L 25/0226 |
| 9,660,743 | B1* | 5/2017 | Ashkenazi | H04B 17/364 |
| 9,735,940 | B1* | 8/2017 | Bakr | H04L 5/0053 |
| 9,929,812 | B2* | 3/2018 | Manolakos | H04W 72/0453 |
| 10,003,998 | B2* | 6/2018 | Chen | H04W 28/06 |
| 10,009,152 | B2* | 6/2018 | Maaref | H04L 1/189 |
| 2004/0190636 | A1* | 9/2004 | Oprea | H04B 7/0417 375/260 |
| 2004/0228272 | A1* | 11/2004 | Hasegawa | H04L 5/026 370/210 |
| 2006/0114816 | A1* | 6/2006 | Maltsev | H04B 7/0417 370/210 |
| 2009/0197546 | A1* | 8/2009 | Kim | H04B 7/0671 455/101 |
| 2010/0075706 | A1* | 3/2010 | Montojo | H04W 72/1273 455/513 |
| 2010/0104032 | A1* | 4/2010 | Clerckx | H04B 7/0417 375/260 |
| 2010/0303163 | A1* | 12/2010 | Adachi | H04L 27/0008 375/260 |
| 2011/0129027 | A1* | 6/2011 | Takaoka | H04L 25/0226 375/260 |
| 2011/0305185 | A1* | 12/2011 | Kwon | H04L 5/0007 370/312 |
| 2012/0033571 | A1* | 2/2012 | Shimezawa | H04B 7/026 370/252 |
| 2012/0062421 | A1* | 3/2012 | Su | H04B 7/0417 342/373 |
| 2012/0093200 | A1* | 4/2012 | Kyeong | H04B 1/711 375/144 |
| 2012/0201163 | A1* | 8/2012 | Jongren | H04W 24/10 370/252 |
| 2012/0213109 | A1* | 8/2012 | Xu | H04B 7/024 370/252 |
| 2012/0213169 | A1* | 8/2012 | Wang | H04B 7/04 370/329 |
| 2012/0213261 | A1* | 8/2012 | Sayana | H04L 5/0048 375/224 |
| 2013/0188579 | A1* | 7/2013 | Touboul | H04B 7/0413 370/329 |
| 2013/0194953 | A1* | 8/2013 | Xu | H04W 52/242 370/252 |
| 2013/0201912 | A1* | 8/2013 | Sheng | H04B 7/0413 370/328 |
| 2013/0244676 | A1* | 9/2013 | Koivisto | H04L 5/0048 455/452.1 |
| 2013/0294333 | A1* | 11/2013 | Chen | H04W 28/06 370/328 |
| 2013/0315321 | A1* | 11/2013 | Rajagopal | H04L 27/2607 375/260 |
| 2014/0301301 | A1* | 10/2014 | Cheng | H04L 5/0048 370/329 |
| 2014/0370904 | A1* | 12/2014 | Smith | H04W 8/005 455/450 |
| 2015/0010046 | A1* | 1/2015 | Kaizu | H04B 7/0885 375/232 |
| 2015/0017993 | A1* | 1/2015 | Ishii | H04W 36/0011 455/444 |
| 2015/0043683 | A1* | 2/2015 | Kato | H04L 5/0048 375/340 |
| 2015/0078190 | A1* | 3/2015 | Cheng | H04W 24/02 370/252 |
| 2015/0215149 | A1* | 7/2015 | Mochizuki | H04L 27/2695 375/219 |
| 2015/0236882 | A1* | 8/2015 | Bertrand | H04L 27/2613 370/329 |

(56) References Cited

U.S. PATENT DOCUMENTS

| | | | |
|---|---|---|---|
| 2015/0282133 A1* | 10/2015 | Kakishima | H04J 11/00 370/329 |
| 2015/0304130 A1* | 10/2015 | Logothetis | H04L 1/0003 455/115.2 |
| 2015/0326273 A1* | 11/2015 | Rakib | H04L 5/0048 375/131 |
| 2016/0073370 A1* | 3/2016 | Axmon | H04W 56/0015 370/350 |
| 2016/0127093 A1* | 5/2016 | Jiang | H04L 5/0051 370/330 |
| 2016/0211943 A1* | 7/2016 | Jung | H04L 1/0054 |
| 2016/0381592 A1* | 12/2016 | Nguyen | G01S 1/22 370/252 |
| 2017/0126295 A1* | 5/2017 | Wu | H04B 7/0452 |
| 2017/0149591 A1* | 5/2017 | Manolakos | H04L 5/0016 |
| 2017/0164367 A1* | 6/2017 | Manolakos | H04W 72/0453 |
| 2017/0180020 A1* | 6/2017 | Namgoong | H04B 7/0456 |
| 2017/0215103 A1* | 7/2017 | Liu | H04W 52/367 |
| 2017/0288759 A1* | 10/2017 | Namgoong | H04B 7/0456 |
| 2017/0289899 A1* | 10/2017 | You | H04W 48/12 |
| 2018/0097534 A1* | 4/2018 | Manolakos | H04B 1/1081 |
| 2018/0138993 A1* | 5/2018 | Kuchler | G01S 7/285 |
| 2018/0175918 A1* | 6/2018 | Weisman | H04B 7/0413 |
| 2018/0248642 A1* | 8/2018 | Si | H04L 5/0053 |
| 2018/0270007 A1* | 9/2018 | Sandberg | H04W 72/1289 |
| 2018/0309599 A1* | 10/2018 | Lee | H04L 5/005 |
| 2018/0337717 A1* | 11/2018 | Nasiri Khormuji | H04B 7/0417 |
| 2019/0081832 A1* | 3/2019 | Marinier | H04L 5/0007 |

OTHER PUBLICATIONS

Wong K.K., et al., "Adaptive Antennas at the Mobile and Base Stations in an OFDM/TDMA System," IEEE Transactions on Communications, Jan. 1, 2001, XP055376979, Retrieved from the Internet: URL:http://ieeexplore.ieee.org/ielx5/26/19441/00898262.pdf [retrieved on May 29, 2017], pp. 195-206.

* cited by examiner

CHANNEL ESTIMATION FOR PER-TONE CONTINUOUS PRECODING IN DOWNLINK MIMO TRANSMISSION

CROSS-REFERENCE TO RELATED APPLICATION(S)

This application claims the benefit of U.S. Provisional Application Ser. No. 62/316,419, entitled "CHANNEL ESTIMATION FOR PER-TONE CONTINUOUS PRECODING IN DOWNLINK MIMO TRANSMISSION" and filed on Mar. 31, 2016, which is expressly incorporated by reference herein in its entirety.

BACKGROUND

Field

The present disclosure relates generally to communication systems, and more particularly, to techniques of channel estimation for per-tone continuous precoding in downlink multiple input multiple output (MIMO) transmission.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive a transmission over a precoded channel. The transmission may include a layer having a plurality of symbols, each symbol having a plurality of modulated tones precoded on a per-tone basis. The receive layer may be associated with a power delay profile. The UE may estimate the precoded channel based on a time support of the power delay profile.

In another aspect of the disclosure, a method, a computer-readable medium, and an apparatus are provided. The apparatus may be a base station. The base station may provide a layer for transmission over a precoded channel. The layer may have a plurality of symbols, each symbol having a plurality of modulated tones precoded on a per-tone basis. The base station may provide information for a remote apparatus related to the precoded channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
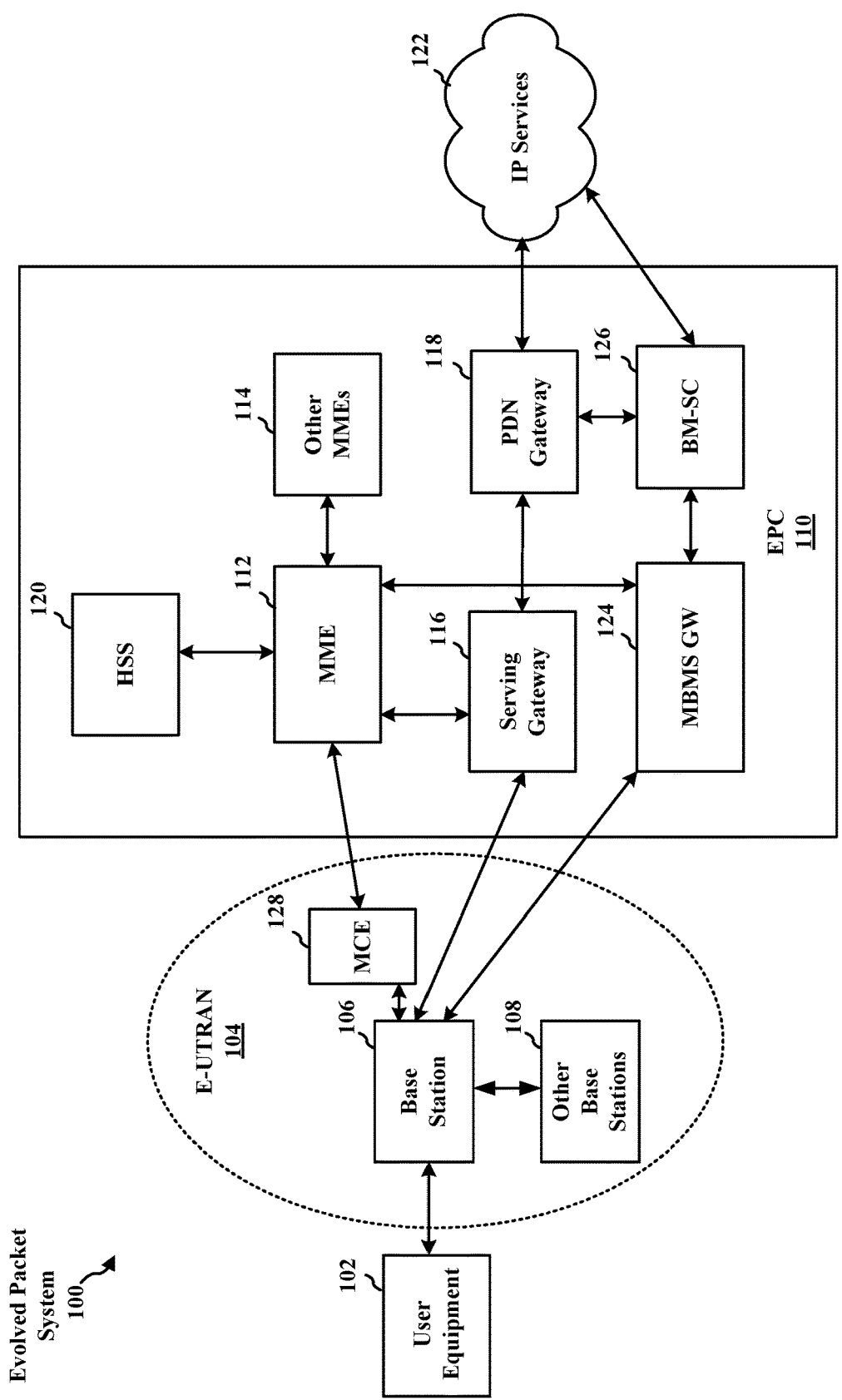
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for providing a thorough understanding of various concepts. However, the concepts may be practiced without the specific details. In some instances, well-known structures and components are shown in block diagram form in order to avoid obscuring such concepts.

Several aspects of telecommunication systems will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity, those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the base station 106 and other base stations 108, and may include a Multicast Coordination Entity (MCE) 128. (The base station 106 and/or the other base stations 108 may be evolved Node Bs, eNBs, eNodeBs, next generation NodeBs, gNBs, or other type of base stations.) The base station 106 provides user and control planes protocol terminations toward the UE 102. The base station 106 may be connected to the other base stations 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the base station 106. The base station 106 may also be referred to as a base station, a Node B, an access point, a base transceiver station, a radio base station, a radio transceiver, a transceiver function, a basic service set (BSS), an extended service set (ESS), or some other suitable terminology. The base station 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The base station 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the base stations (e.g., 106, 108) belonging to a Multicast Broadcast Single Frequency Network (MBSFN) area broadcasting a particular service, and may be responsible for session management (start/stop) and for collecting eMBMS related charging information.

Figure 2:
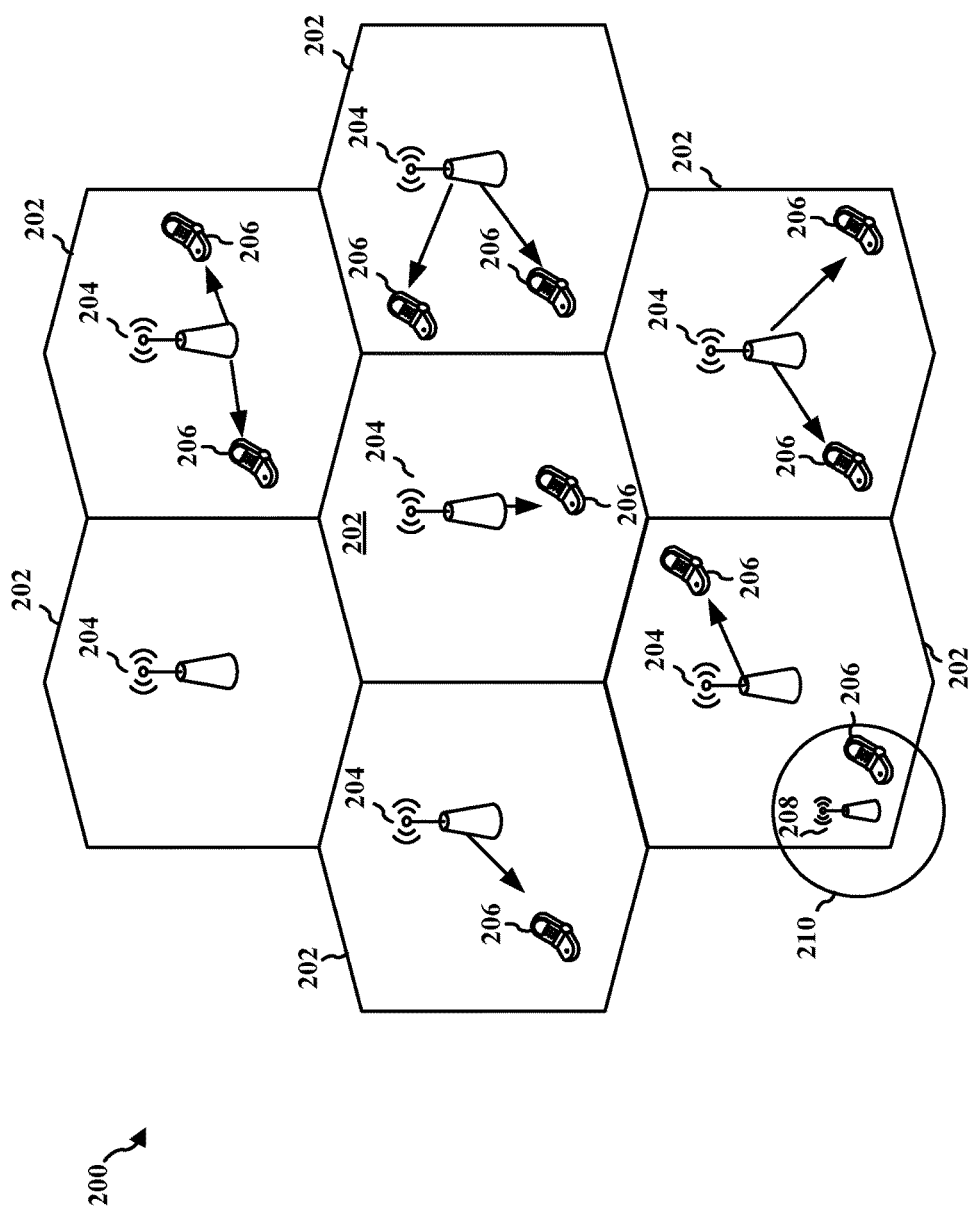
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class base stations 208 may have cellular regions 210 that overlap with one or more of the cells 202. The lower power class base station 208 may be a femto cell (e.g., home base station (HeNB, HgNB, or other home base station)), pico cell, micro cell, or remote radio head (RRH). The macro base stations 204 are each assigned to a respective cell 202 and are configured to provide an access point to the EPC 110 for all the UEs 206 in the cells 202. There is no centralized controller in this example of an access network 200, but a centralized controller may be used in alternative configurations. The base stations 204 are responsible for all radio related functions including radio bearer control, admission control, mobility control, scheduling, security, and connectivity to the serving gateway 116. A base station may support one or multiple (e.g., three) cells (also referred to as a sectors). The term "cell" can refer to the smallest coverage area of a base station and/or a base station subsystem serving a particular coverage area. Further, the terms "eNB," "base station," "gNB," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. The system capacity may be increased by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base station 204 to identify the source of each spatially precoded data stream.

Spatial multiplexing may be used when channel conditions are good. When channel conditions are less favorable, beamforming may be used to focus the transmission energy in one or more directions. The transmission energy may be focused by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
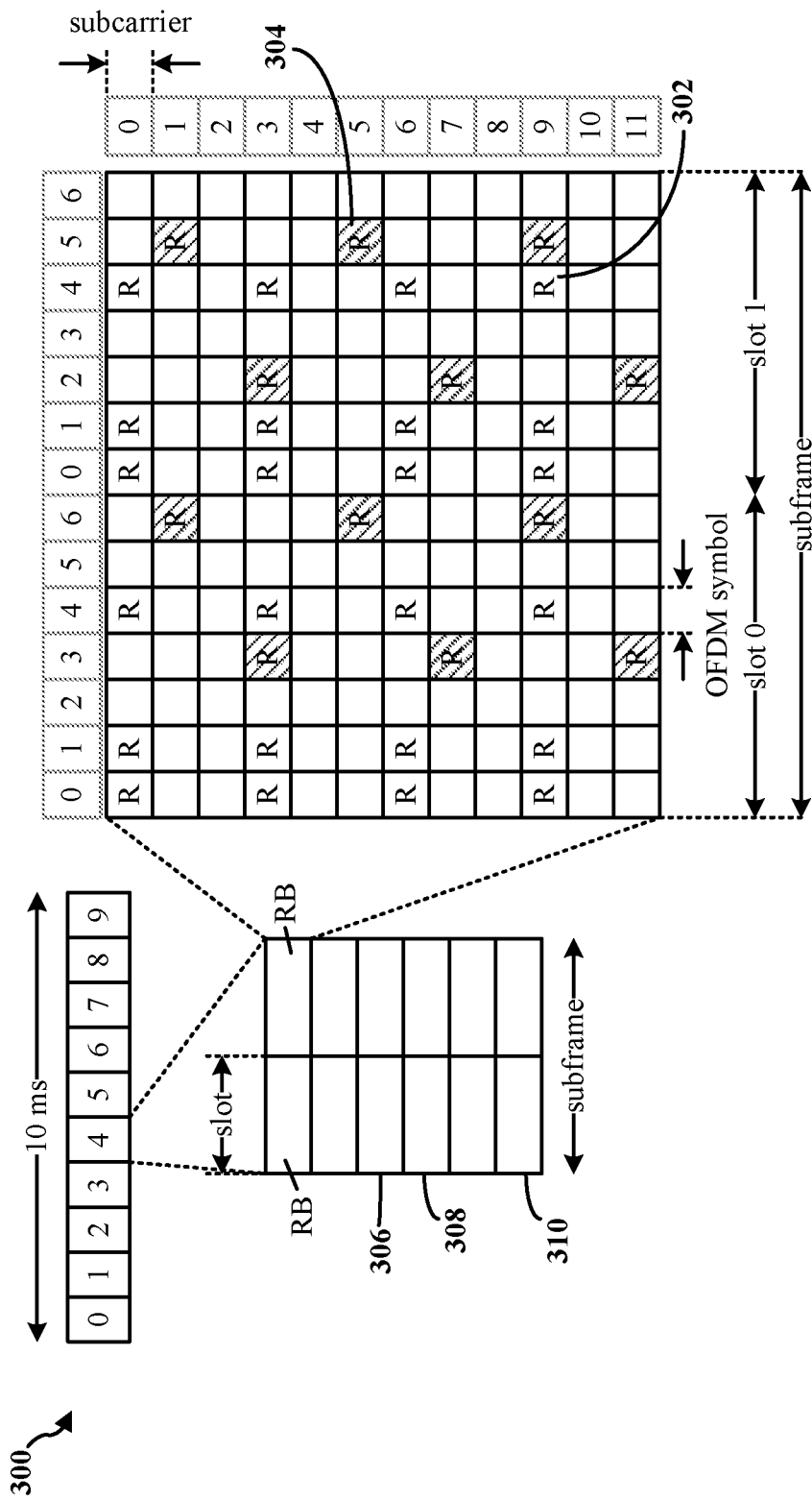
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and seven consecutive OFDM symbols in the time domain, for a total of 84 resource elements. For an extended cyclic prefix, a resource block contains 12 consecutive subcarriers in the frequency domain and six consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE. Referring to FIG. 3, resource blocks may be allocated in a contiguous fashion. For example, resource blocks 306, 308 are contiguous to each other in the frequency domain because the resource blocks 306, 308 are group of resource blocks that are adjacent to each other in the frequency domain. However, resource blocks 306, 310 are not contiguous to each other in the frequency domain.

Figure 4:
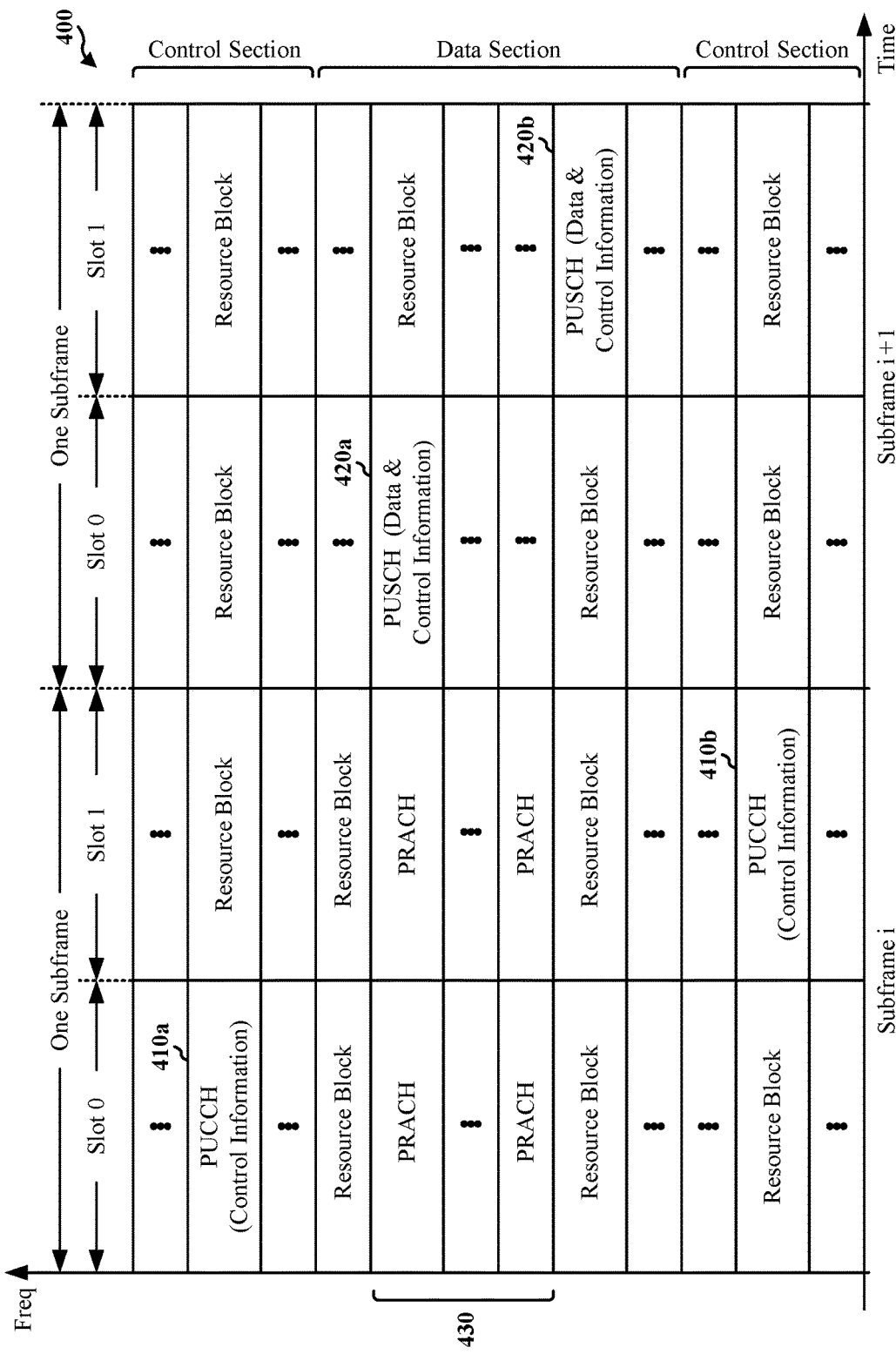
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to a base station. The UE may also be assigned resource blocks 420a, 420b in the data section to transmit data to the base station. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The network specifies the starting frequency. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
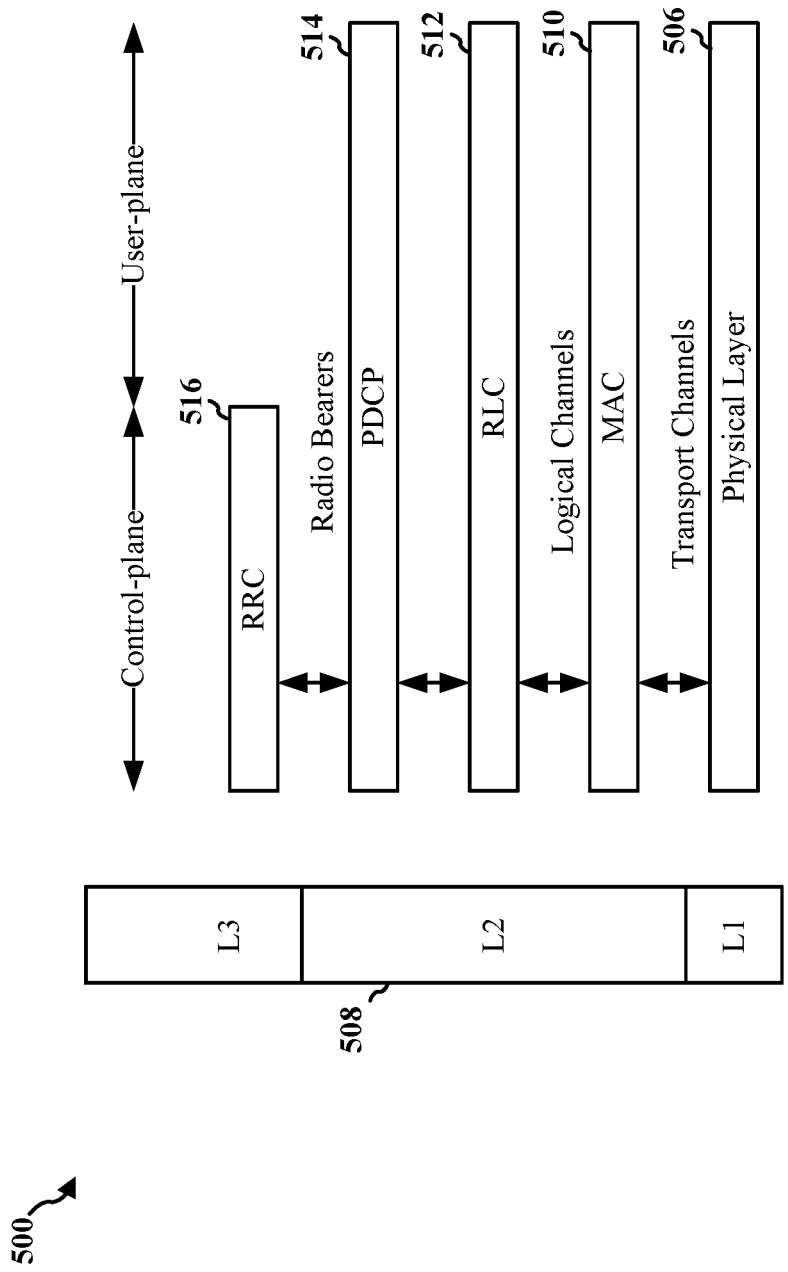
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the base station is illustrated with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and base station over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the base station on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between base stations. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and base station is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the base station and the UE.

Figure 6:
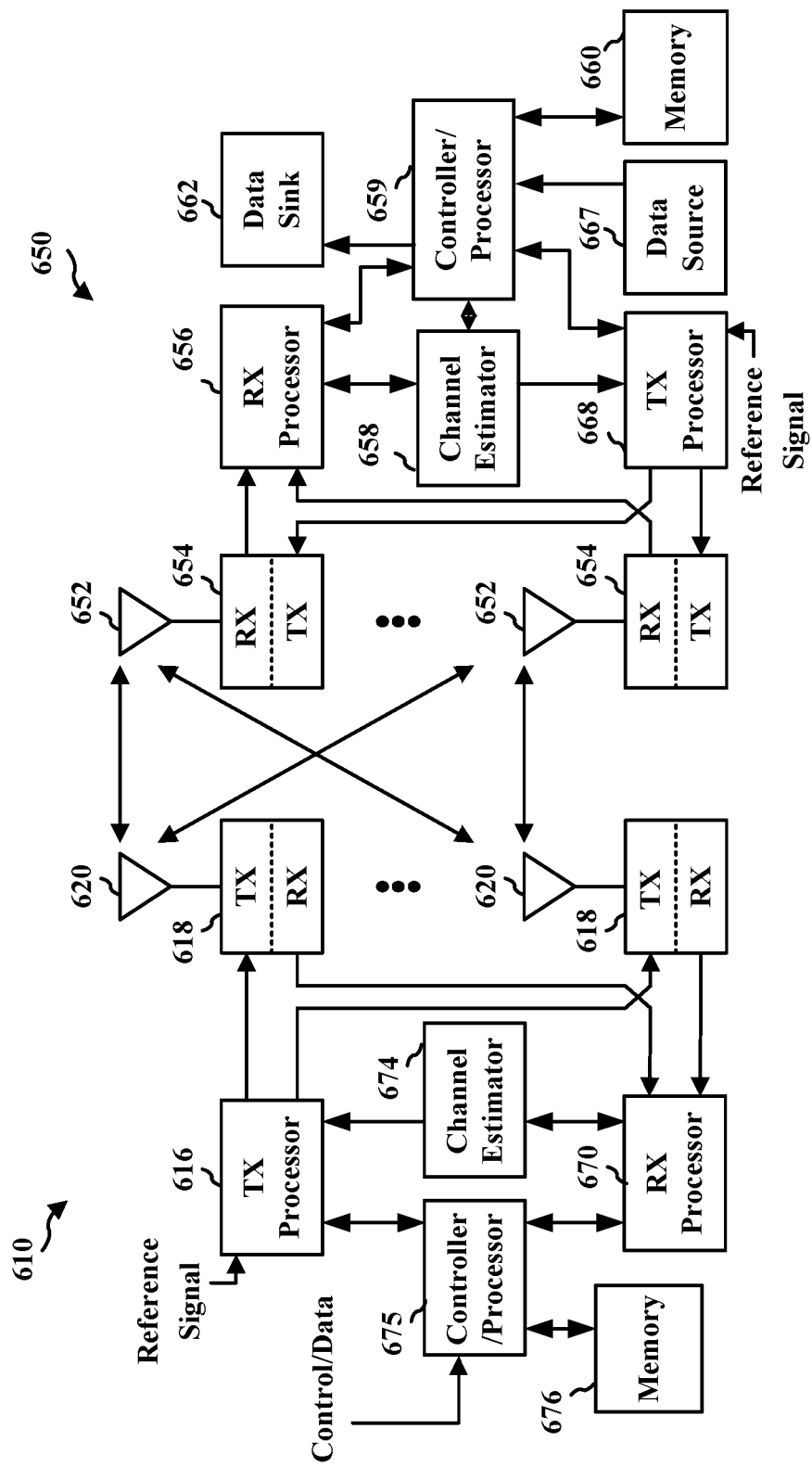
FIG. 6 is a diagram illustrating an example of an evolved Node B and user equipment in an access network.

FIG. 6 is a block diagram of a base station 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 610.

These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 610, the controller/processor 659 implements the L2 layer for the user plane and the control plane by providing header compression, ciphering, packet segmentation and reordering, and multiplexing between logical and transport channels based on radio resource allocations by the base station 610. The controller/processor 659 is also responsible for HARQ operations, retransmission of lost packets, and signaling to the base station 610.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In MIMO transmissions, per-resource block (per-RB) precoding may be applied on transmitted signals. That is, an entire resource block may be precoded in the same way. However, per-tone precoding may achieve higher throughput than per-RB precoding. For per-tone precoding, different tones within a resource block may be precoded differently.

Figure 7:
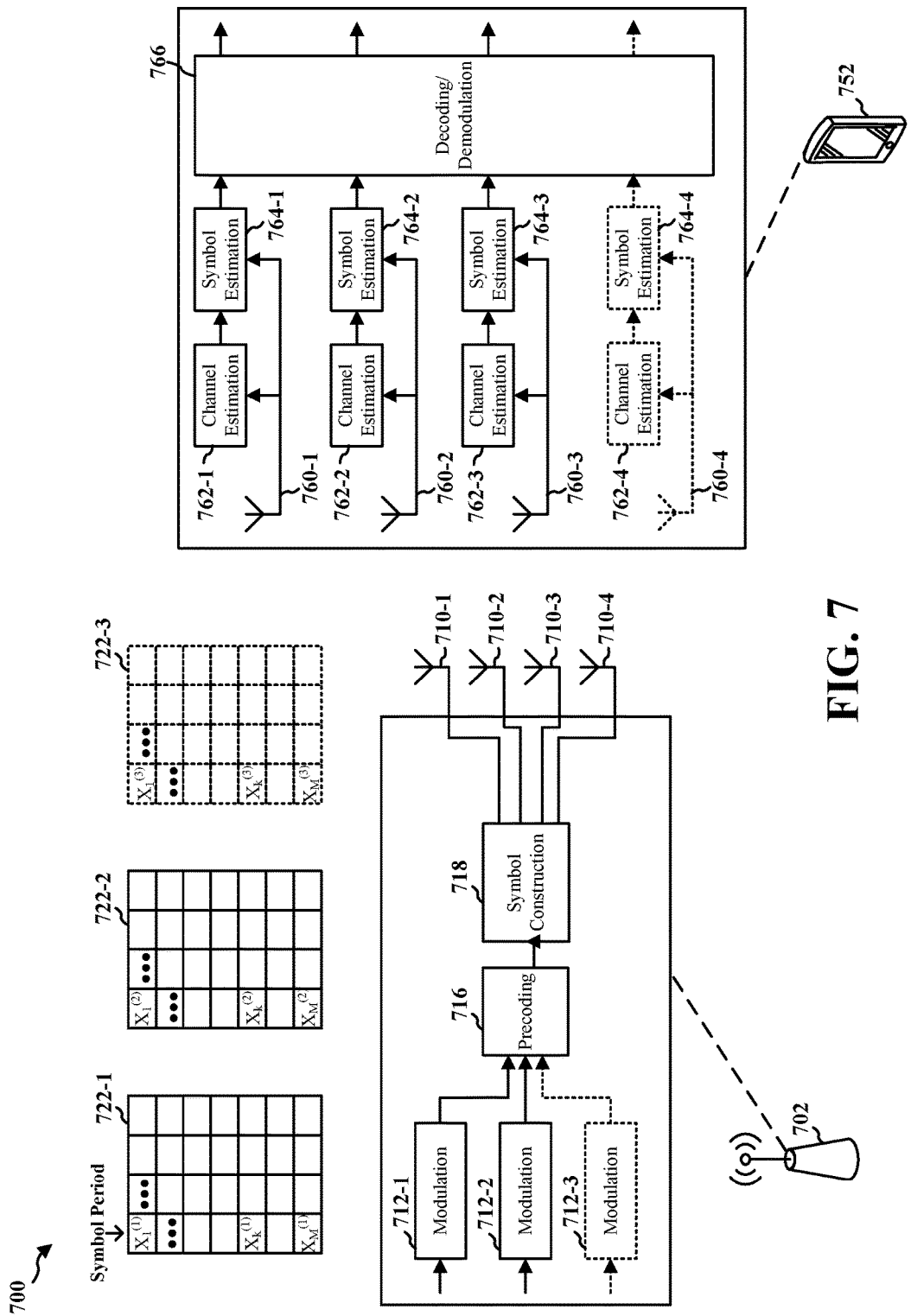
FIG. 7 is a diagram illustrating communication between a base station and a UE based on per-tone precoding.

FIG. 7 is a diagram 700 illustrating communication between a base station and a UE based on per-tone precoding. A base station 702 has a number $N_t$ antennas. The base station 702 may transmit L layers of symbols to a UE 752. A layer may also be known as a data stream. L may be any suitable integer that is greater than 0. The UE 752 has a number $N_r$ antennas and receives the symbols transmitted from the base station 702.

In a first example, the base station 702 has four antennas 710-1, 710-2, 710-3, 710-4 (i.e., $N_t$ is 4). The UE 752 has three antennas 760-1, 760-2, 760-3 (i.e., $N_r$ is 3). Further, the number L of layers transmitted by the base station 702 is equal to the number $N_r$ of antennas of the UE 752. In other words, L is 3 in the first example. Further, the base station 702 may employ L modulation components (e.g., modulation components 712-1, 712-2, 712-3) that each receive a sequence of bits and map the bits into a symbol block 722-1, 722-2, 722-3. The symbol blocks 722-1, 722-2, 722-3 each may contain modulation symbols, such as QPSK or QAM symbols, on M tones (e.g., 100) in one or more symbol periods. In certain configurations, the M tones may be contiguous in the frequency domain. In one symbol period, each of the modulation components 712-1, 712-2, 712-3 (e.g., which may correspond to the controller/processor 675) sends a layer of modulation symbols (e.g., one modulation symbol on each of the M tones from the respective generated symbol block 722-1, 722-2, 722-3) to a precoding component 716 (e.g., which may correspond to the controller/processor 675). Subsequently, on each of the M tones, the precoding component 716 precodes L modulation symbols (one modulation symbol from each of the L layers) to generate $N_t$ precoded symbols, each of which is to be transmitted by a respective one of the antennas 710-1, 710-2, 710-3, 710-4.

The UE 752 receives the precoded symbols from the base station 702 at the antennas 760-1, 760-2, 760-3. Each of the antennas 760-1, 760-2, 760-3 transmits the received signals to channel estimation components 762-1, 762-2, 762-3 (e.g., which may correspond to the channel estimator 658) and a symbol estimation components 764-1, 764-2, 764-3 (e.g., which may correspond to the controller/processor 659) for processing. In particular, the received signals include demodulation reference signals (DMRS) or UE-specific reference signals (UE-RSs). The channel estimation components 762-1, 762-2, 762-3 may perform channel estimation based on the DMRSs. Further, the processed signals are sent to a decoding/demodulation component 766 (e.g., which may correspond to the controller/processor 659) for decoding and demodulation.

In the present disclosure, $x_k^{(v)}$ denotes a modulation symbol from the $v^{th}$ layer to be transmitted on the $k^{th}$ tone. In one symbol period, the modulation components 712-1, 712-2, 712-3 send, on the $k^{th}$ tone, $x_k^{(1)}, x_k^{(2)}, \ldots, x_k^{(L)}$ to the precoding component 716. The precoding component 716 may use $x_k^{(1)}, x_k^{(2)}, \ldots, x_k^{(L)}$ to form an L×1 vector $\underline{x_k}$:

$$\underline{x_k} = [x_k^{(1)}, x_k^{(2)}, \ldots, x_k^{(L)}]^T.$$

For example, the precoding component 716 receives, on the $1^{st}$ tone, $x_1^{(1)}, x_1^{(2)}$, and $x_1^{(3)}$ from the modulation components 712-1, 712-2, 712-3 and forms $\underline{x_1}$, which is $[x_1^{(1)}, x_1^{(2)}, x_1^{(3)}]^T$. The precoding component 716 similarly receives modulation symbols on the $2^{nd}$ tone, the $3^{rd}$ tone, and so on.

Upon receiving $\underline{x}_k$, the precoding component 716 applies a precoding matrix $P_k$ to $\underline{x}_k$ to transform $\underline{x}_k$ to an $N_t \times 1$ vector $\underline{s}_k$:

$$s_k = [s_k^{(1)}, s_k^{(2)}, \ldots, s_k^{(N_t)}]^T.$$

$s_k^{(j)}$ denotes a precoded symbol to be transmitted by the $j^{th}$ antenna on the $k^{th}$ tone. In the first example, the precoding component 716 transforms $[x_1^{(1)}, x_1^{(2)}, x_1^{(3)}]^T$ to $[s_1^{(1)}, s_1^{(2)}, s_1^{(3)}, s_1^{(4)}]^T$. The precoding component 716 may use the techniques described infra to generate the respective precoding matrix for each of the M tones.

The precoding component 716 initially obtains a channel matrix for the UE 752. For example, the UE 752 may transmit sounding reference signals (SRSs) to the base station 702. Using the received SRS (e.g., taking advantage of UL/DL channel reciprocity of a TDD system), the base station 702 may estimate DL channel matrices for the UE 752. More specifically, for the $k^{th}$ tone, the base station 702 estimate a channel matrix $H_k$.

In a first technique to determine a precoding matrix $P_k$, the precoding component 716 may apply singular value decomposition (SVD) to $H_k$ such that:

$$H_k = U_k \Sigma_k V_k^H.$$

$H_k$ is an $N_r \times N_t$ matrix. $\Sigma_k$ is an $N_r \times N_r$ diagonal matrix. $U_k$ is an $N_r \times N_r$ left singular vector matrix. $V_k$ is an $N_t \times N_r$ right singular vector matrix. The columns of $U_k$ and $V_k$ each may form an orthonormal set. In the first technique, the precoding component 716 may use $V_k$ as the precoding matrix $P_k$ for the $k^{th}$ tone. The choices of $V_k$ available to the precoding component 716, however, may not be unique. For example, $U_k \Theta_k$ and $V_k \Theta_K$ can also be the left singular vector matrix and right singular vector matrix of $H_k$, where $\Theta_k$ is an $N_r \times N_r$ diagonal matrix with the diagonal elements having unit amplitude. That is, $|\Theta_k(i,i)|$ is 1, where i is from 1 to $N_r$.

In the first technique, as described supra, the base station 702 may use $V_k$ as the precoding matrix $P_k$ for the $k^{th}$ tone. The signals transmitted by the base station 702, and observed by the UE 752, on the $k^{th}$ tone is $H_k P_k \underline{x}_k$:

$$H_k P_k \underline{x}_k = H_k V_k \underline{x}_k = U_k \Theta_k \Sigma_k \underline{x}_k.$$

As described supra, there is ambiguity in the phase of both the right singular vector matrix and the left singular vector matrix, which leads to the phase ambiguity across the tones of precoded channels received by the UE 752. On the other hand, having the precoding matrices applied at the base station 702 to the tones in the symbol blocks 722-1, 722-2, 722-3 be continuous across the tones may be desirable. For example, having the precoding matrices applied at the base station 702 to the tones in the symbol blocks 722-1, 722-2, 722-3 be continuous across the tones may allow for the wide-band channel estimation at the UE 752. Channel estimation performance tends to be more accurate as the bandwidth increases. The ambiguity described supra leads to discontinuity across the tones, which increases the delay spread in the precoded channels. (The delay spread may refer to the time dispersion of a signal over different paths.) As a result, the channel estimation may become less accurate and, thus, the UE throughput may be lower.

In a second technique to determine a precoding matrix $P_k'$, the precoding matrices $P_k'$ are modified to address the ambiguity and discontinuity described supra. For any $N_r \times N_r$ unitary matrix $\Xi_k$, the precoding component 716 may use $V_k \Xi_K$ as a precoding matrix $P_k'$ to achieve the same capacity as the precoding matrix $P_k$ (i.e., $V_k$). Furthermore, the precoding component 716 may choose $U_k^H$ as $\Xi_k$. As such, the precoding component 716 determines:

$$P_k' = V_k U_k^H.$$

$P_k'$ is an $N_t \times N_r$ matrix (the second technique may be referred to as "Rotated SVD (RSVD)" precoding). As such, the phase ambiguity in the left singular vector matrix and the right singular vector matrix may be eliminated. More specifically, the signals observed by the UE 752 are:

$$H_k P_k' \underline{x}_k = H_k V_k U_k^H \underline{x}_k = U_k \Sigma_k U_k^H \underline{x}_k.$$

As shown, $P_k'$ removes the arbitrary phase introduced by the left singular vector matrix and the right singular vector matrix on the precoded channels.

More specifically, for the $k^{th}$ tone, the observed signals at the UE 752 are:

$$H_k P_k' \underline{x}_k = \sum_v \sum_{l=1}^{N_r} \sqrt{\lambda_{kl}} u_{kl} u_{kl}^*(v) x_k^{(v)}$$

where $\sqrt{\lambda_{kl}}$ is the l-th diagonal element of $\Sigma_k$ and $u_{kl}$ is the l-th column vector of $U_k$. Thus, the observed precoded channel for the $v^{th}$ layer signal is $\Sigma_{l=1}^{N_r} \sqrt{\lambda_{kl}} u_{kl} u_{kl}^*(v)$. The singular vectors are coherently combined on the $v^{th}$ element, but not on the other elements. As such, the $v^{th}$ layer is received strongest on the $v^{th}$ receive antenna.

In an example of the second technique, as described supra in the first example, the base station 702 has $N_t$ (e.g., 4) antennas and the UE 752 has $N_r$ (e.g., 3) antennas. The number L of layers at the base station 702, however, is less than the number ($N_r$) of antennas of the UE 752. In the second example, L is 2. Accordingly, the base station 702 may employ two modulation components (e.g., modulation components 712-1, 712-2) that each receive a sequence of bits and map the bits into a symbol block 722-1, 722-2.

As described supra, in one symbol period, each of the modulation components sends a respective layer of modulation symbols (e.g., one modulation symbol on each of the M tones from the respective generated symbol block 722-1, 722-2) to the precoding component 716. Subsequently, on each of the M tones, the precoding component 716 precodes L modulation symbols (one symbol from each of the L respective layers) to generate $N_t$ precoded symbols, each of which is to be transmitted by a respective one of the antennas 710-1, 710-2, 710-3, 710-4. Further, as described supra, the precoding component 716 may use $x_k^{(1)}, x_k^{(2)}, \ldots, x_k^{(L)}$ to form an $L \times 1$ (e.g., $2 \times 1$) vector $\underline{x}_k$:

$$\underline{x}_k = [x_k^{(1)}, \ldots, x_k^{(L)}]^T.$$

Further, as described supra, the base station 702 may estimate, e.g., based on SRSs received from the UE 752, a channel matrix $H_k$ for the $k^{th}$ tone. The $H_k$ may be an $N_r \times N_t$ matrix. Using the second technique described supra, the precoding component 716 may determine $P_k'$, which is an $N_t \times N_r$ matrix. In the example of the second technique, L is less then $N_r$. Thus, $P_k'$ may not be used as a precoding matrix to transform $\underline{x}_k$ to $\underline{s}_k$. The base station 702 may use a third technique as described infra to determine a $P_k''$, which is an $N_t \times L$ matrix.

In a first option of the third technique, the precoding component 716 may select L columns from the precoding matrix $P_k'$ to form a $P_k''$ based on a rule. For example, the precoding component 716 may select the initial L columns of the $P_k'$.

Further, $H_k$ has $N_r$ rows, each corresponding to an antenna at the UE 752. In a second option of the third technique, the precoding component 716 may compute the total energy on all the tones (e.g., from the $1^{st}$ tone to the $M^{th}$ tone) received at each receive antenna. The total energy received at the $j^{th}$ antenna may be denoted as $E^{(j)}$. The precoding component 716 may compute $E^{(j)}$ as:

$$E^{(j)} = \sum_{k=1}^{M} \|H_k(j,:)\|^2$$

where $\|H_k(j,:)\|$ is 1-2 norm of the $j^{th}$ row of the $H_k$. $\|H_k(j,:)\|^2$ may be considered as the energy of the channel received at the $j^{th}$ antenna of the UE 752 on the $k^{th}$ tone.

The precoding component 716 may select L antennas of the at least L antennas of the UE 752 based on certain rules. Based on the $E^{(j)}$, the precoding component 716 may determine L antennas of the at least L antennas of the UE 752 that have the largest energy. For example, the precoding component 716 may rank the at least L antennas from highest energy to lowest energy and select the L antennas with most energy. The precoding component 716 may select the corresponding rows of the $H_k$ to form a reduced channel matrix $H_k'$. $H_k'$ is an L×$N_t$ matrix. More specifically, idx(L) denotes the indices of the L selected antennas. $H_k'$ may be determined as:

$$H'_k = H_k(idx(L),:).$$

Subsequently, the precoding component 716 may, similarly to the second technique, apply SVD to the $H_k'$:

$$H'_k = U'_k \Sigma'_k V'^H_k.$$

As in the second technique, the precoding component 716 determines:

$$P''_k = V'_k U'^H_k.$$

$P_k''$ is an $N_t$×L matrix. As such, the precoding component 716 can apply $P_k''$ to $\underline{x}_k$ in order to transform $\underline{x}_k$ to precoded symbols $\underline{s}_k$.

In the above examples, after obtaining the precoded symbols $\underline{s}_k$, OFDM symbols may be formed, by a symbol construction component 718 (e.g., which may correspond to the TX processor 616), for transmission by the antennas 710-1, 710-2, 710-3, 710-4. For example, assume $N_t$ OFDM symbols are to be formed (one OFDM symbol for each of the $N_t$ antennas). To form the first OFDM symbol to be transmitted on the first antenna (e.g., the antenna 710-1), the first element of $\underline{s}_1$ may be put on the first tone of the first OFDM symbol, the first element of $\underline{s}_2$ may be put on the second tone of the first OFDM symbol, and the first element of $\underline{s}_k$ may be put on the $k^{th}$ tone of the first OFDM symbol. To form the second OFDM symbol to be transmitted on the second antenna (e.g., the antenna 710-2), the second element of $\underline{s}_1$ may be put on the first tone of the second OFDM symbol, the second element of $\underline{s}_2$ may be put on the second tone of the second OFDM symbol, and the second element of $\underline{s}_k$ may be put on the $k^{th}$ tone of the second OFDM symbol. The process may be repeated for other OFDM symbols to be transmitted on other antennas (e.g., the antennas 710-3, 710-4). In an aspect, the output of the symbol construction component 718 may be subjected to an IFFT for transmission via the antennas 710-1, 710-2, 710-3, 710-4.

In an aspect, per-tone precoding may be applied on different DL channels. For example, per-tone precoding may be used for transmitting the PDSCH. Demodulation reference signals (DMRSs) may be transmitted along with the PDSCH for purposes of facilitating channel estimation. DMRSs may be an on-demand pilot that is intended for a single UE (e.g., the UE 752) and sent using the same per-tone precoding as the PDSCH. In an aspect, the DMRS may be a UE-specific reference signal (e.g., the UE-RS 304). In another aspect, the same precoding may be applied to both the DMRS and the PDSCH.

To enable channel estimation of the per-tone precoded channels at the UE 752, the base station 702 may allocate to the UE 752 a group of resource blocks that are contiguous in the frequency domain (e.g., the resource blocks 306, 308). The precoding applied to the resource blocks 306, 308 may be continuous across the tones (e.g., the precoding may change in such a manner that the amplitude and the phase of the precoded channel change smoothly (or consistently) across the tones).

As an example, if precoding matrices of $P_1$, $P_2$, and $P_3$ are continuous, then precoding matrices of $P_1$, $P_2$, and $P_3$ are not continuous due to the phase jump introduced to $P_2$ by changing $P_2$'s polarity. Discontinuity of the precoded channel across the tones may make channel estimation difficult. Discontinuous precoding may increase the delay spread in the precoded channel beyond an amount that channel estimation algorithms can process for a given DMRS density in frequency domain, which degrades throughput at the UE 752. In an aspect, for per-resource block precoding, there may be discontinuity in the precoding on the resource block boundaries. Some examples of continuous per-tone precoding may include maximal ratio transmission (MRT) precoding and RSVD precoding.

In an aspect, when the base station 702 applies continuous per-tone precoding techniques in DL MIMO transmission, the base station 702 may select a receive antenna of the UE 752 for transmitting each layer (or data stream) of PDSCH or of some other channel. For example, suppose that the UE 752 has four receive antennas, and the base station 702 transmits two layers (or spatial streams) of PDSCH. For the transmission of the first layer of PDSCH, the base station 702 may select the first receive antenna at the UE 752 (e.g., the antenna 760-1). For the transmission of the second layer of the PDSCH, the base station 702 may select the fourth receive antenna at the UE 752 (e.g., the antenna 760-4).

The precoded channel for a layer may have a dominant path at the receive antenna selected by the base station 702 for transmission of the layer. The dominant path for a layer may be defined as the strongest path of the precoded channel for the layer at the receive antenna of the UE 752 that the base station 702 selected for transmission of the layer. In an aspect, the selection of the UE receive antenna for each layer may be based on the design of the precoding component 716.

Channel estimation for a precoded channel may present several challenges. In an aspect, the precoded channel may be viewed as the result of a time-domain convolution of the downlink propagation channel (between a pair of the base station 702 transmit antenna and the UE 752 receive antenna) with the impulse response of the precoder symbols that make up the precoding matrices. The propagation channel may refer to the actual physical propagation channel between the base station 702 and the UE 752. In an aspect, the base station 702 may not apply precoding to the CRS, so when the UE 752 measures the channel from the CRS, the UE 752 measures the underlying propagation channel and not the precoded channel. By contrast, the base station 702 may apply precoding to the DMRS, and when the UE 752 measures the DMRS, the UE 752 measures the precoded channel. In other words, in order to demodulate and decode the PDSCH, the UE 752 may need to estimate the precoded channel using the DMRS rather than the CRS.

To perform channel estimation using the DMRS, assume $Z_p$ is the vector of DMRS tones received at the UE 752 at a UE antenna. Then, for each element of $Z_p$, the UE 752 may perform descrambling:

$$Y_p(i) = s^*(i) Z_p(i)$$

In the above expression, $s^*(i)$ may represent the $i^{th}$ modulation symbol used by DMRS tones before precoding, where i an integer used to indicate a particular modulation symbol. $s^*(i)$ may have unit energy, such that $|s^*(i)|^2 = 1$. Descrambling may involve removing the modulation symbol employed by the DMRS tones to obtain the channel information. Ignoring the contribution from noise to the received signal, the vector of DMRS tones may be characterized by $$Z_p(i) = \tilde{H}p(i) s(i)$$

In the above expression, $Y_p(i) = \tilde{H}_p(i)$, and $\tilde{H}_p$ may be the precoded channel to be estimated. In an aspect, channel estimation for the precoded channel at the PDSCH tones may be performed by $$\hat{H}_d = W Y_p$$

In the above expression, $\hat{H}_d$ may be the estimated precoded channel at the PDSCH tones, $Y_p$ may be the vector of DMRS tones after "descrambling," which is obtained by removing the modulation symbol used by the DMRS tones, and W may be the robust minimum mean-square error (RMMSE) channel estimator. RMMSE channel estimator may be characterized by $$W = R_{H_d H_p} \left( R_{H_p} + \frac{1}{SNR} I \right)^{-1}$$

In the above expression, $R_{H_p}$ may correspond to the channel correlation matrix of the precoded channel at the DMRS tones, and $R_{H_d H_p}$ may correspond to the channel cross correlation between the precoded channel at the PDSCH tones and the precoded channel at the DMRS tones. To compute $R_{H_p}$ and $R_{H_d H_p}$, the UE 752 may need to know the power delay profile (PDP) of the precoded channel, the time support of the PDP, and the Doppler spread. RMMSE may assume that the PDP is rectangular; therefore, all that is needed may be the time support of the PDP, the Doppler spread, and the SNR of the received signal to compute W.

Figure 8:
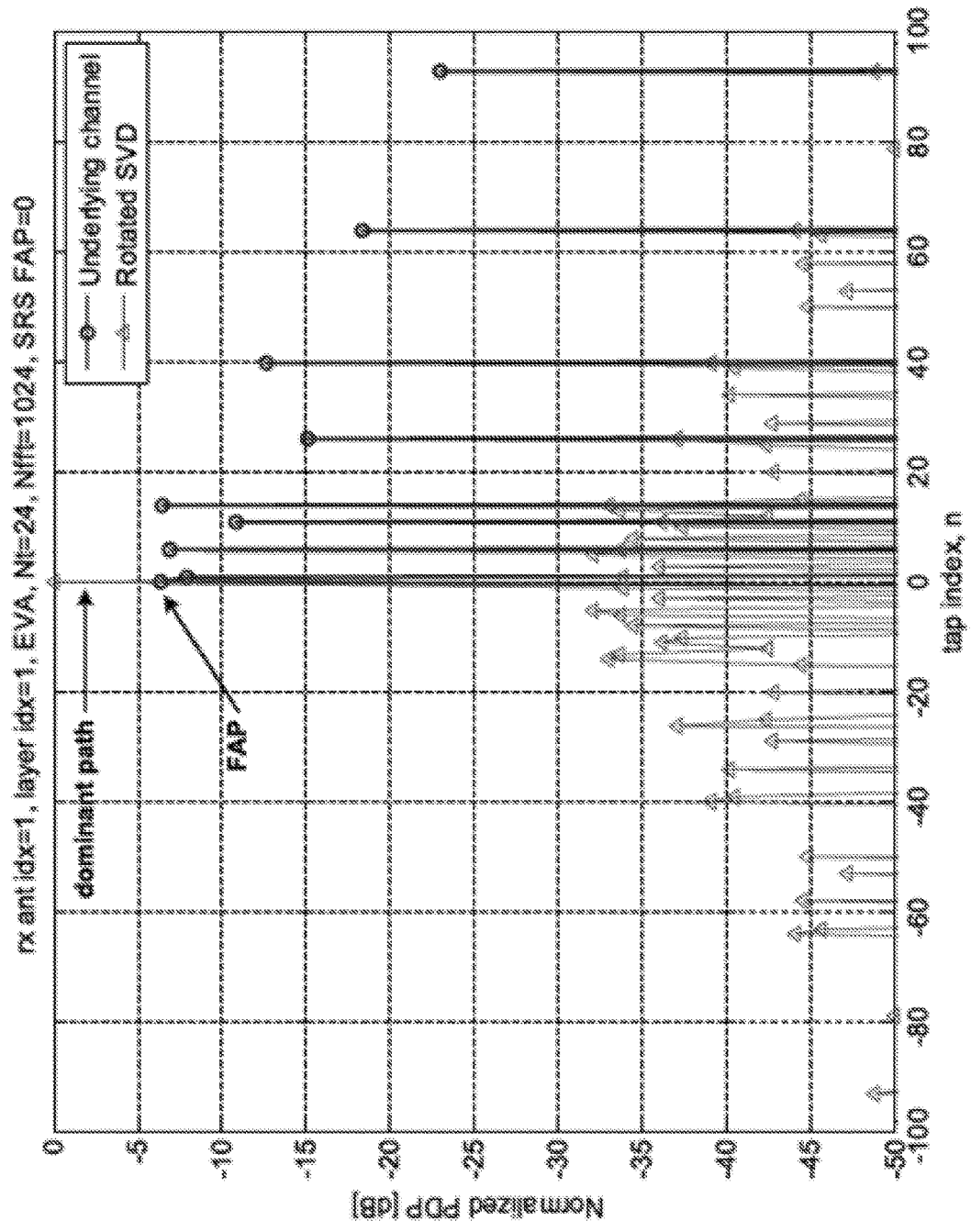
FIG. 8 is a first graph of a normalized PDP of a precoded channel.
Figure 9:
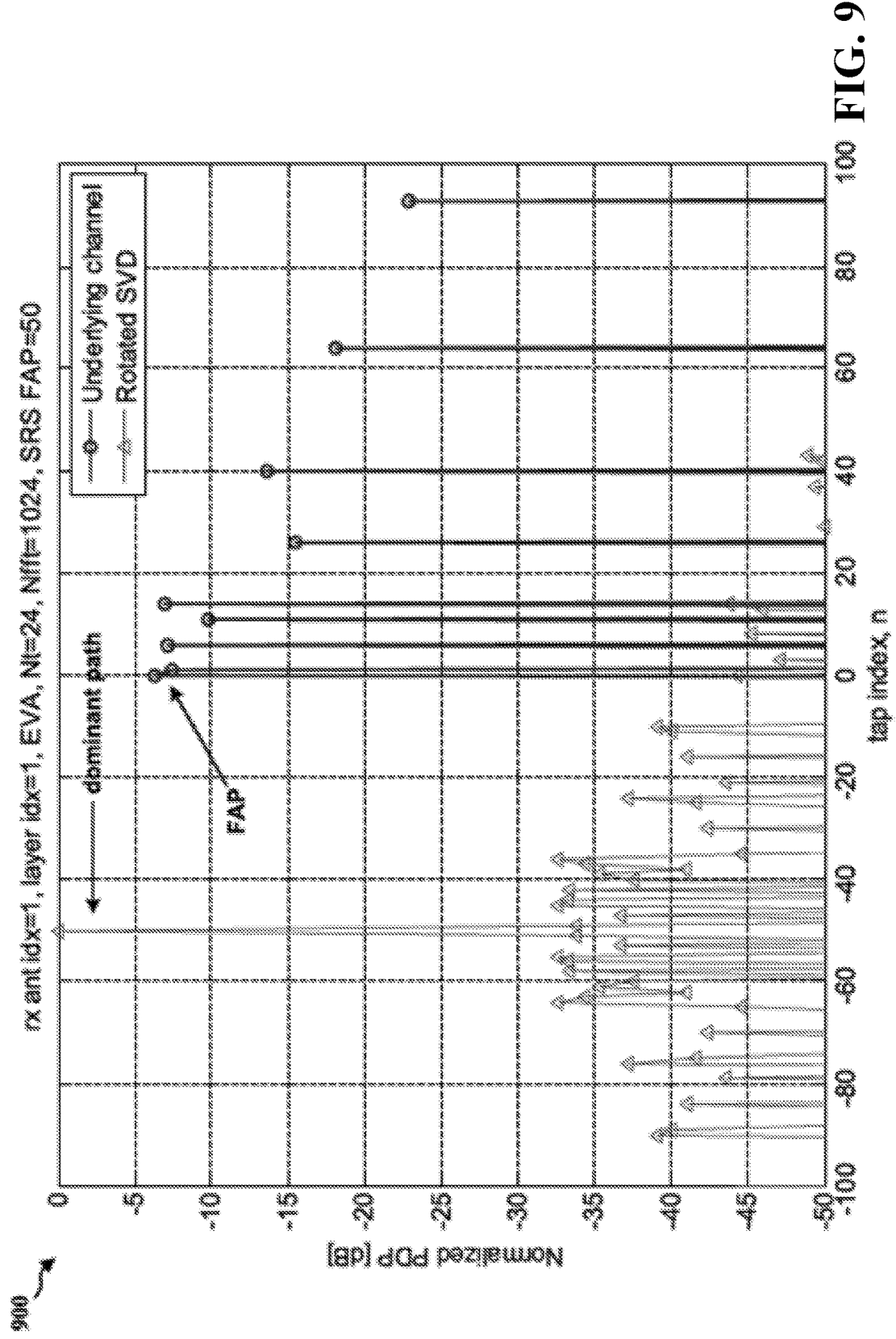
FIG. 9 is a second graph of a normalized PDP of a precoded channel.
Figure 10:
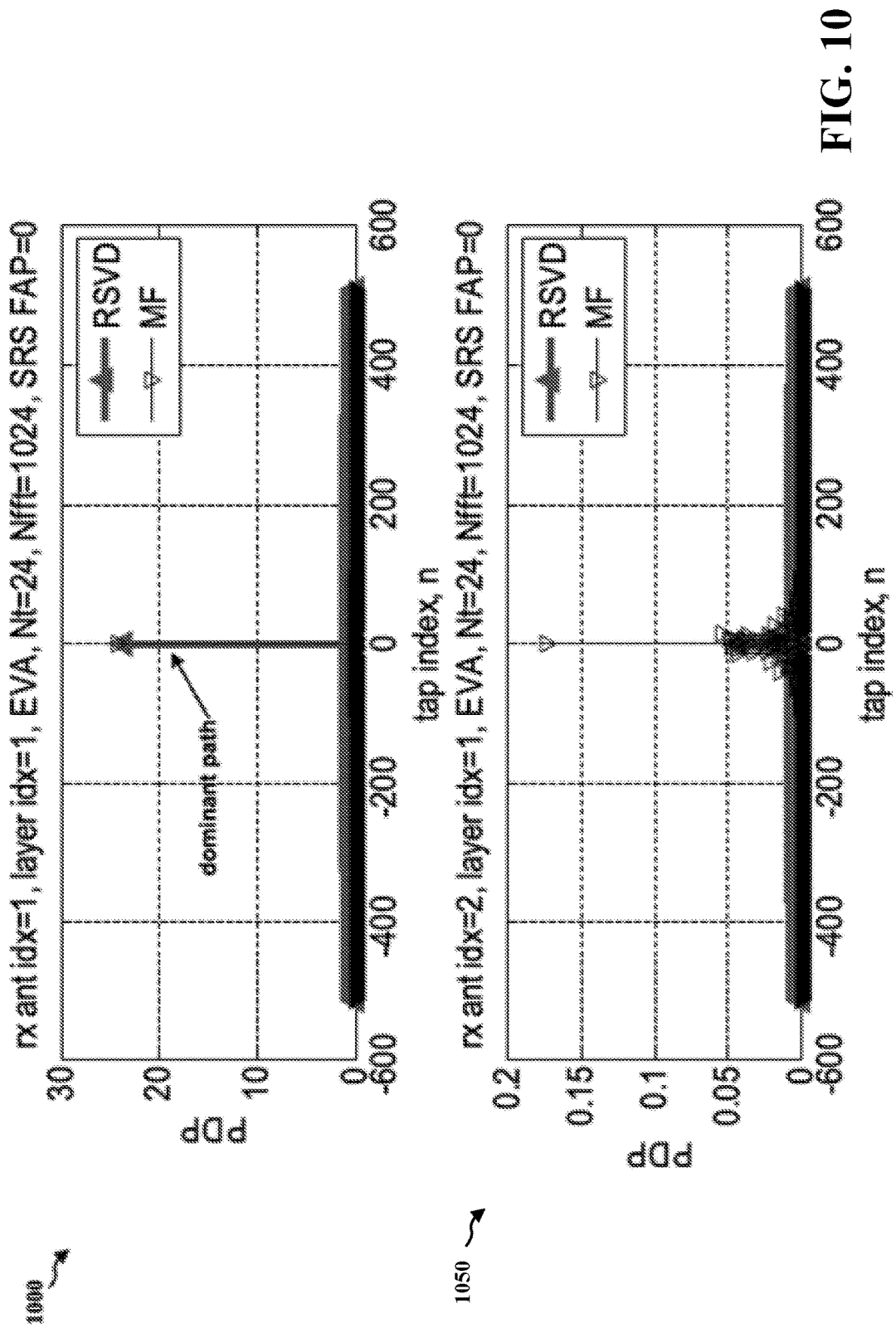
FIG. 10 illustrates graphs of a dominant path.

As a result of the per-tone precoding in MIMO transmission, the PDP of the precoded channel and the PDP's time support may be different from the PDP of the propagation channel without precoding and its time support. The PDP may be the average power of the channel impulse response of the propagation channel as a function of time delay. The length of the time support of the PDP is the delay spread. The time support of a signal may refer to the time range in which a signal resides (e.g., is non-zero). As such, information on the PDP of the propagation channel and the PDP's time support, which may be obtained from CRSs may not be used in the estimation of the precoded channel. FIGS. 8-10 illustrate some challenges associated with channel estimation for precoded channels using per-tone precoding.

FIG. 8 is a first graph 800 of a normalized PDP of a precoded channel. Referring to FIG. 8, a base station may have 32 transmit antennas and a UE may have two receive antennas, capable of receiving two layers. FIG. 8 assumes that 1024 tones are used to measure a channel, which has been precoded based on RSVD precoding. The tone spacing is 36 kHz in the example of FIG. 8. The underlying propagation channel may be an Extended Vehicular A channel (EVA). The first path of the propagation channel for the SRS received at the base station may be time aligned with the start of the base station FFT window for the reception of uplink signals. In the first graph 800, the base station may choose the first receive antenna of the UE for transmitting the first layer of PDSCH, for example. The time interval between the two adjacent taps is referred to as a "chip". In this example, one chip corresponds to 1/(1024*36e3)=27 ns. As illustrated in FIG. 8, there is a significant time-shift in the center of the PDP of the precoded channel (at tap index=0), which may have a time support of approximately [−67, 67], compared with the center of the PDP of the propagation channel, which may have a time support of approximately [0, 95]. Also as illustrated in FIG. 8, the dominant path of the precoded channel, as seen by the UE, is aligned with the first arriving path (FAP) of the propagation channel.

FIG. 9 is a second graph 900 of a normalized PDP of a precoded channel. Referring to FIG. 9, a base station may have 32 transmit antennas and a UE may have two receive antennas, capable of receiving two layers. FIG. 9 assumes that 1024 tones are used to measure a channel in the example of FIG. 9, which has been precoded based on RSVD precoding. The tone spacing is 36 kHz. The underlying propagation channel may be EVA. The first path of the propagation channel for the SRS received at the base station is delayed by 50 chips from the start of the base station FFT window for uplink signals. In the second graph 900, the base station may choose the first receive antenna of the UE for transmitting the first layer of PDSCH, for example. As illustrated in FIG. 9, there is a significant time-shift in the center of the PDP of the precoded channel (at approximately tap index=−50), compared with the center of the PDP of the propagation channel. Also as illustrated in FIG. 9, the dominant path of the precoded channel, as seen by the UE, is 50 chips away from the FAP of the propagation channel.

FIG. 10 illustrates graphs 1000, 1050 of a dominant path. Referring to FIG. 10, a base station may have 32 transmit antennas and a UE may have two receive antennas, capable of receiving two layers. FIG. 10 assumes that 1024 tones are used to measure a channel, which has been precoded based on RSVD precoding. The underlying propagation channel may be EVA. The first path of the propagation channel for the SRS received at the base station may be time aligned with the start of the base station FFT window for uplink signals. Referring to FIG. 10, the base station may have formed precoding matrices for transmitting the first and second layers of the PDSCH. To transmit the first layer, the base station may choose the first UE antenna, and to transmit the second layer, the base station may choose the second UE antenna. The "dominant path" for a layer may be defined as the strongest path of the precoded channel for the layer received at the receive antenna of the UE that the base station chose for the transmission of the layer. The graph 1000 illustrates the PDP of the first layer being transmitted to the first UE antenna, and the graph 1050 illustrates the PDP of the first layer being transmitted to the second UE antenna. As illustrated in FIG. 10, the precoded channel for the first layer has a dominant path in the first receive antenna. The location of the dominant path is at the center of the time support of the PDP of the precoded channel. FIG. 10 does not show the dominant path for the second layer.

The above-mentioned observations may also be true for other types of precoding, such as MRT and zero-forcing precoding.

The knowledge of the time support of the PDP may be needed for channel estimation. However, as illustrated in FIGS. 8-10, the time support of the PDP of the precoded channel is not necessarily aligned in time with the time support of the propagation channel. As such, when performing channel estimation of a precoded channel, the difference in time support may need to be taken into account. As such, the base station may need to indicate to the UE that continuous per-tone precoding is utilized for DL MIMO transmission. Based on the indication, the UE may not use the time support for the CRS for estimating the precoded channel.

In one configuration, referring to FIG. 7 as an example, when the base station 702 has a layer (or stream) to transmit on the downlink, the base station 702 may select a UE receive antenna. At the chosen UE receive antenna, there may be one dominant path in the channel impulse response (CIR) of the precoded channel. Further, the location of the dominant path of the precoded channel may be at the center of the time support of the PDP of the precoded channel. In an aspect, the center location of the time support may be approximately the same in the precoded channels for the layer (or stream) at all of the UE receive antennas. Accordingly, the UE 752 may estimate the location of the dominant path by applying IFFT-based channel estimation to the DMRS for the layer received at the UE receive antenna chosen for the layer. That is, the UE 752 may receive signals from the base station 702 and perform an FFT to extract the DMRS. Subsequently, the UE 752 may perform an IFFT on the DMRS extracted from the FFT result to obtain the channel impulse response of the precoded channel. Based on the channel impulse response, the UE 752 may determine the location of the dominant path. The UE 752 may use the location of the dominant path to determine the time support of the PDPs of the precoded channel for the layer (or stream) at all of the UE receive antennas. Via downlink control information (DCI), the base station 702 may indicate to the UE 752 the index of the UE receive antenna for the layer, where the measurement of the dominant path may take place. The UE 752 may measure the delay spread, $\tau_{d,CRS}$, of the underlying propagation channel from the cell-specific RS (CRS), and use a value proportional to $\tau_{d,CRS}$ as the delay spread of the precoded channel. In an aspect, the value may be 1.5, such that the delay spread of the precoded channel may be assumed to be $1.5\tau_{d,CRS}$. Alternatively, using the SRS received in the UL, the base station 702 may determine the delay spread of the precoded channel for each layer and indicate the delay spread information to the UE 752. By knowing the delay spread and the location of the dominant path, the UE 752 may determine the time support of the PDP of the precoded channel. For example, referring to FIG. 9, the UE 752 may determine that the location of the dominant path is at −50, and may determine that the delay spread for the propagation channel is 95. The delay spread for the precoded channel is 142.5 (=95*1.5). Assuming −50 is at the center of the PDP, then the time support of the precoded channel may be in the approximate range of [−121, 21]. The UE 752 may then use the determined time support of the precoded channel for performing channel estimation.

Figure 11:
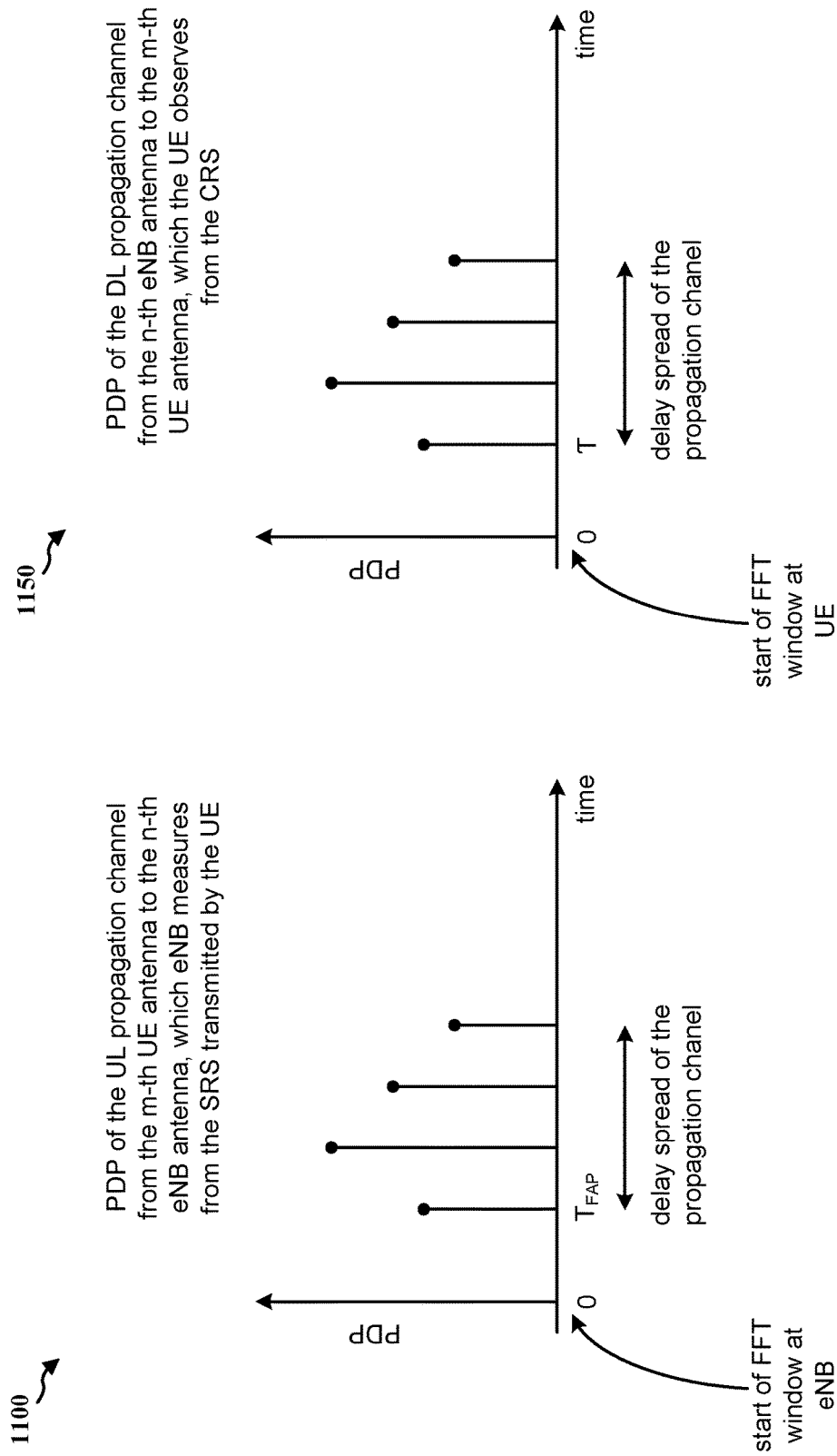
FIGS. 11 and 12 illustrate example flows of performing channel estimation for per-tone precoded channels.
Figure 12:
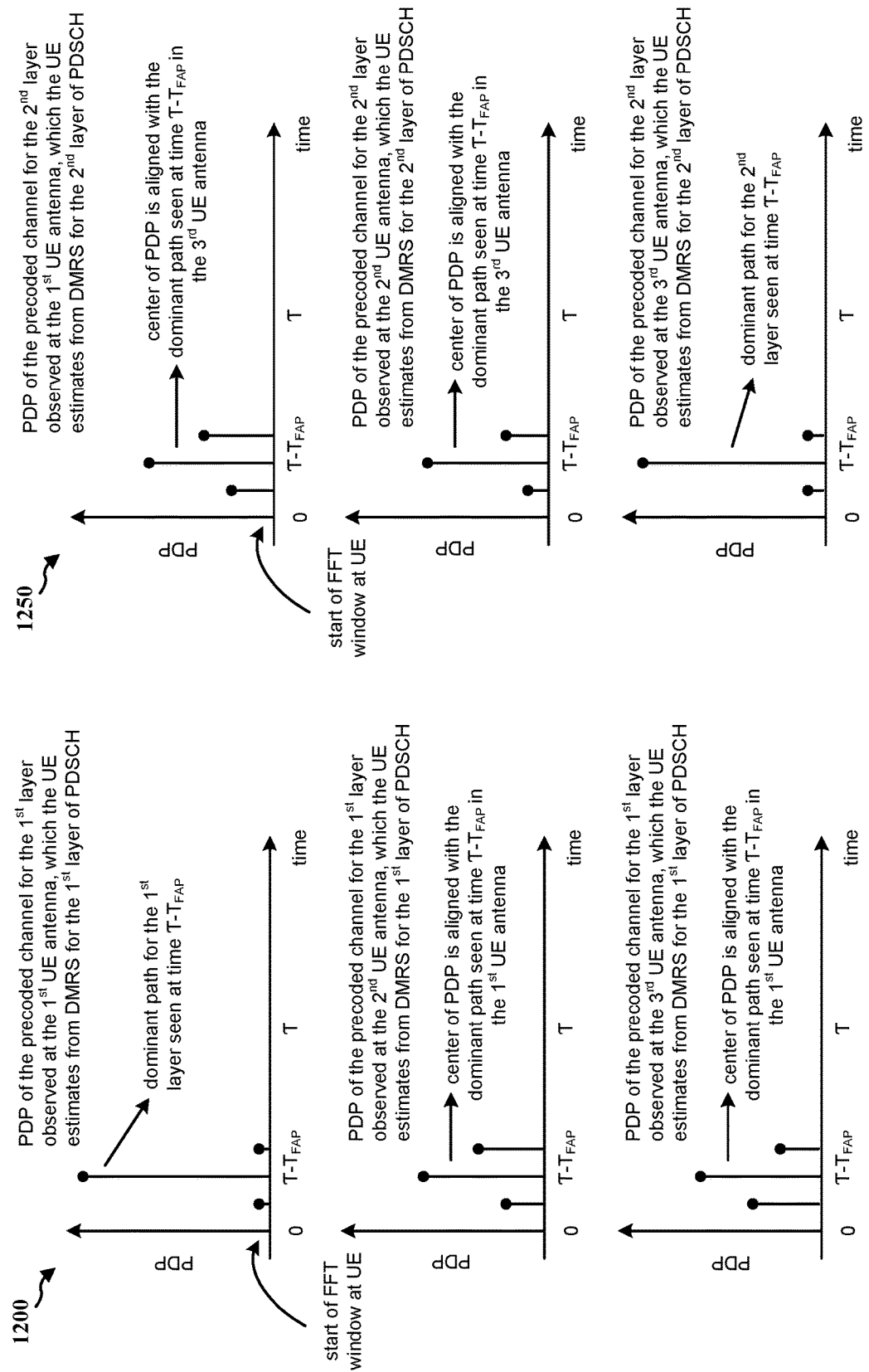

FIGS. 11 and 12 illustrate example flows of performing channel estimation for per-tone precoded channels. By way of example, FIGS. 11 and 12 will be discussed with respect to the base station 702 and the UE 752. FIG. 11 illustrates a first PDP 1100 and a second PDP 1150, each PDP having four paths for a signal, e.g., four paths for the signal from the transmitter to the receiver. The first PDP 1100 is of the UL propagation channel between the base station 702 and the UE 752 with respect to a transmit and receive antenna pair. The m-th UE antenna may transmit an SRS to the n-th base station antenna, and the base station 702 may measure the propagation channel based on the SRS received from the UE 752. The $T_{FAP}$ may refer to the time of the first arriving path (FAP) of the UL propagation channel in seconds with respect to the start of the FFT window used by the base station 702 for uplink signals. The second PDP 1150 is of the DL propagation channel between the base station 702 and the UE 752 with respect to a transmit and receive antenna pair. The base station 702 may transmit, via the n-th base station antenna, a CRS to the m-th UE antenna. The UE 752 may measure the DL propagation channel based on the received CRS. Referring to the second PDP 1150, r may represent the FAP of the DL propagation channel with respect to the start of the UE 752's FFT window. In FIG. 11, the base station may estimate the propagation channels and determine the precoding to apply to each of the layers of PDSCH and DMRS, for example. In an aspect, the uplink propagation channel may be reciprocal with respect to the downlink propagation channel in a TDD system, and therefore, the base station 702 may estimate the downlink propagation channel based on the base station's estimation of the uplink propagation channel. Having estimated the uplink propagation channel, the base station may determine the precoding to apply to each of the layers of PDSCH and DMRS.

FIG. 12 illustrates diagrams 1200, 1250 for downlink precoding and UE channel estimation. Referring to FIG. 12, assume the UE 752 has three receive antennas, and the base station 702 is scheduling the transmission of two layers of PDSCH to the UE 752. Other types of signals may also be transmitted. The base station 702 may determine which UE antenna to select for each layer for precoding based on the estimated downlink propagation channel, which may be estimated based on the reciprocal properties of the downlink propagation channel with respect to the uplink propagation channel. For the first layer of the PDSCH, the base station 702 may select the first UE antenna for reception. In addition, for the second layer of the PDSCH, the base station may select the third UE antenna for reception. The diagram 1200 refers to the PDP of the precoded channel when the first layer of the PDSCH is received at the first, second, and third UE antennas. Similar to the other diagrams, the $T_{FAP}$ may refer to the time of the FAP of the UL propagation channel in seconds, with respect to the start of the FFT window used by the base station 702 for UL signals. The FAP of the DL propagation channel may be at time τ, which respect to the start of the UE 752's FFT window. In the example of FIG. 12, the $T_{FAP}$ may be greater than 0, and therefore, the dominant path may appear at the $T_{FAP}$ before the time τ (i.e., τ-$T_{FAP}$). As illustrated in the diagram 1200, the dominant path for the first layer is associated with the first UE antenna. The diagram 1250 refers to the PDP of the precoded channel when the second layer of the PDSCH is received at the first, second, and third UE antennas. As illustrated in the diagram 1250, the dominant path for the second layer is associated with the third UE antenna.

After selecting the UE antennas for receiving the downlink transmission on the precoded channel, the base station 702 may transmit a downlink control signal to the UE 752 indicating transmission of PDSCH (or some other information) and DMRS will be precoded according to per-tone continuous precoding method, and the selected antenna for each layer of the PDSCH. In an aspect, different downlink control information may be transmitted for each layer to be transmitted. For example, the base station 702 may transmit a downlink control signal (e.g., a PDCCH with DCI messages) to indicate to the UE 752 the chosen antenna for each layer of the PDSCH. In the example of FIG. 12, the base station 702 may indicate that the first UE antenna is selected for the first layer of the PDSCH and the third UE antenna is selected for the second layer of the PDSCH. In another aspect, the downlink control signal may also include the delay spread of the precoded channel.

Subsequently, upon receiving the transmitted layers, the UE 752 may perform channel estimation on the receive layers. The UE 752 may determine the dominant path for each receive layer based on the control information provided by the base station 702. The UE 752 may determine the location of the dominant path for the first layer of PDSCH using the DMRS for the first layer that is received at the first UE antenna. The UE 752 may find the location of the second dominant path for the second layer of PDSCH using the DMRS for the second layer that is received at the third UE antenna. For the precoded channel for the first layer of PDSCH, the UE 752 may use the location of the dominant path found in the first antenna to determine the time support of the PDP of the precoded channels for the first layer, which is received at the first, second, and third UE antennas (see diagram 1200). For the precoded channels for the second layer of PDSCH, the UE 752 may use the location of the dominant path found in the third antenna to determine the time support of the PDPs of the precoded channels for the second layer, which is received at the first, second, and third UE antennas (see diagram 1250).

Aside from performing channel estimation of the uplink propagation channel using the SRS, the base station 702 may use the SRS to determine the location of the FAP of the UL propagation channel with respect to the start of the FFT window used by the base station 702 for the demodulation of uplink signals. For example, the channel matrix observed at the k-th tone from the SRS may be given by:

$$H_k e^{-j2\pi k \Delta f T_{FAP,UL}}$$

Referring to the above equation, $\Delta f$ may refer to the tone spacing in Hertz (Hz) (e.g., 35 kHz), $T_{FAP,UL}$ may refer to the FAP location in seconds with respect to the start of the FFT window used by the base station 702 for uplink signals, and $H_k$ may be the $N_r \times N_t$ matrix of the propagation channel with $T_{FAP,UL}=0$ (as such, the term $e^{-j2\pi k \Delta f T_{FAP,UL}}$ is a phase rotation/ramp that may arise when the FAP is not aligned with the start of the FFT window used by the base station; $H_k$ corresponds to the channel matrix when the FAP is aligned with the start of the FFT window). Regarding the $N_r \times N_t$ matrix, $N_r$ corresponds to the number of receive antennas at the UE 752, and $N_t$ corresponds to the number of transmit antennas at the base station 702. If $T_{FAP,UL}>0$, then the dominant path of the precoded channel may appear $T_{FAP,UL}$ seconds earlier than the FAP of the downlink propagation channel, when observed by the UE 752. If $T_{FAP,UL}<0$, then the dominant path of the precoded channel may appear $|T_{FAP,UL}|$ seconds later than the FAP of the downlink propagation channel, when observed by the UE. If $T_{FAP,UL}=0$, then the dominant path of the precoded channel may be aligned with the FAP of the downlink propagation channel.

At the output of the precoder (e.g., the precoding component 716), the base station 702 may compensate for phase ramp on the precoded symbols, which may be caused by a non-zero $T_{FAP,UL}$. In an aspect, the precoded symbols for the k-th tone may be multiplied by $e^{-j2\pi k \Delta f T_{FAP,UL}}$ for purposes of phase ramp compensation. For example, referring to FIG. 9, by performing phase ramp compensation, the dominant path of the precoded channel may be aligned with the FAP of the DL propagation channel (similar to the graph in FIG. 8), instead of the dominant path preceding the FAP of the DL propagation channel. In this aspect, the dominant path of the precoded channel may become more aligned with the FAP of the downlink propagation channel, when the dominant path is received by the UE 752. As a result, the UE 752 may use the location of the dominant path for downlink timing synchronization (e.g., use the location of the dominant path to determine the FAP of the DL propagation channel, which in turn is used in adjusting the position of the receiver FFT window in order to maximize the tone signal to interference and noise ratio (SINR)). For example, the FAP of the propagation channel may be difficult to locate because the strength of the FAP may be weak. Therefore, the location of the FAP may alternatively be determined using the location of the dominant path of the precoded channel, if the dominant path is aligned with the FAP.

Figure 13:
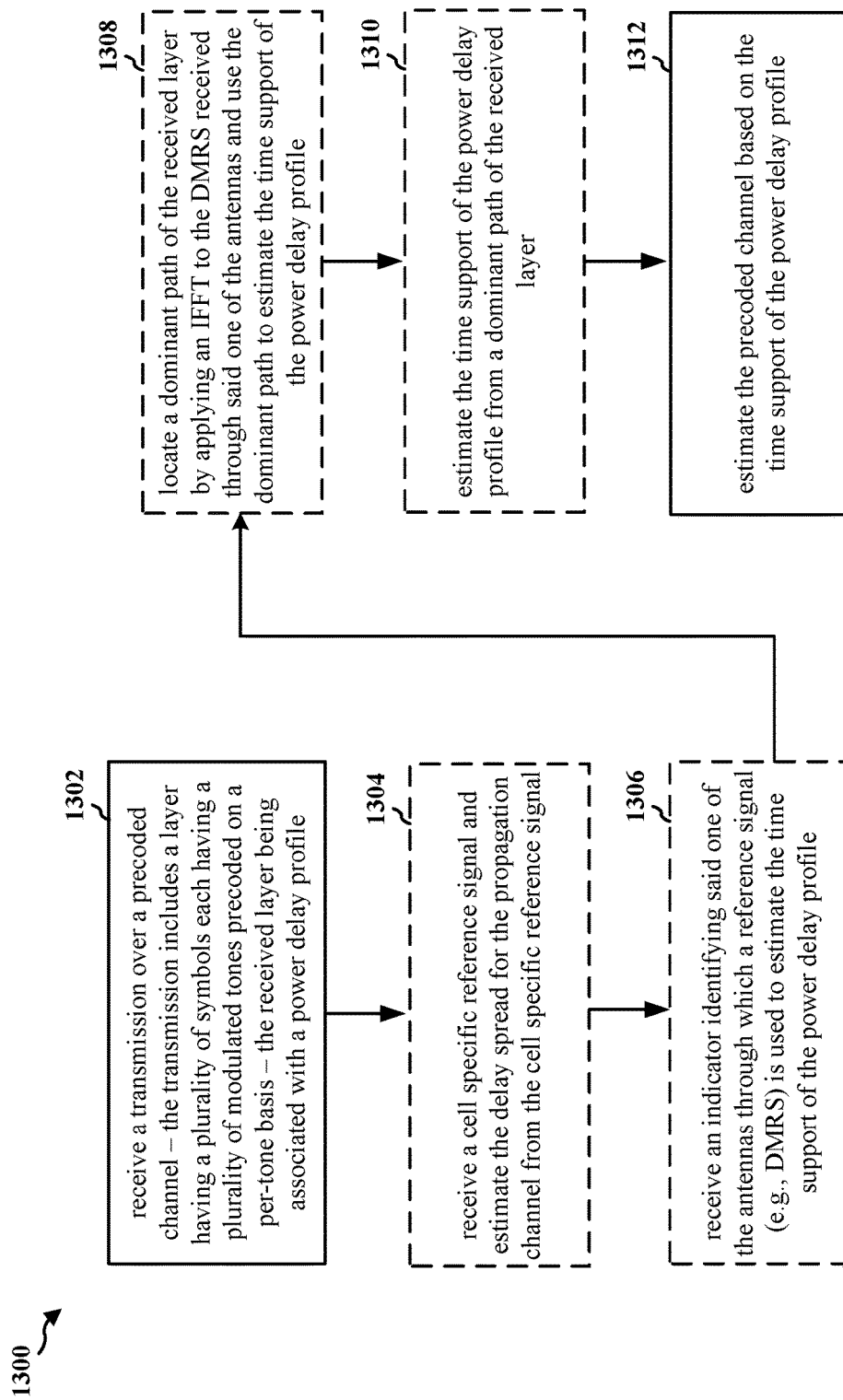
FIG. 13 is a flowchart of a method of wireless communication.

FIG. 13 is a flowchart 1300 of a method of wireless communication. The method may be performed by a UE (e.g., the UE 752, the apparatus 1502/1502'). At 1302, the UE may receive a transmission over a precoded channel. The transmission may include a layer (or a stream) having a plurality of symbols, each symbol having a plurality of modulated tones precoded on a per-tone basis. The receive layer may be associated with a power delay profile. In an aspect, the UE may receive the transmission through a plurality of antennas. The layer may further include a reference signal on one or more of the symbols. In a first aspect, the UE may be configured to estimate the time support of the power delay profile from the reference signal received through one of the antennas. In another aspect, the transmission may include one or more additional layers, and each of the one or more additional layers may have a plurality of symbols, each symbol having a plurality of modulated tones precoded on a per-tone basis. In another aspect, at least one of the plurality of modulated tones precoded on a per-tone basis or the second plurality of modulated tones precoded on a per-tone basis are phase ramp compensated.

For example, referring to FIG. 7, the UE 752 may be configured to receive a first layer of the PDSCH (the transmission) over the precoded channel. The first layer may have a plurality of OFDM symbols, each symbol having a plurality of modulated tones precoded on a per-tone basis. The first layer may have a PDP. The first layer may include DMRSs (reference signals) on one or more symbols. The DMRS may be a UE-specific reference signal. In the example of FIG. 7, the UE 752 may also receive a second layer of PDSCH that includes OFDM symbols with a number of modulated tones precoded on a per-tone basis.

At 1304, the UE may receive a cell specific reference signal and estimate the delay spread for the propagation channel from the cell specific reference signal. For example, referring to FIG. 7, the UE 752 may receive a CRS from the base station 702 and estimate the delay spread for the DL propagation channel from the CRS. The CRS may be different from the DMRS.

At 1306, the UE may receive an indicator identifying said one of the antennas through which the reference signal (e.g., the DMRS) is received, wherein the reference signal is used to estimate the time support of the power delay profile. For example, referring to FIG. 7, the UE 752 may receive downlink control information (the indicator) via the PDCCH. For a layer, the downlink control information may identify the UE antenna of the UE 752 at which the DMRS for the layer may be used to estimate the time support of the PDP of the precoded channel for the layer.

At 1308, the UE may locate a dominant path of the receive layer by applying an IFFT to the reference signal (e.g., the DMRS) received through said one of the antennas and use the dominant path to estimate the time support of the power delay profile. In an aspect, the UE may use the dominant path to adjust the position of an FFT window of the receiver. For example, referring to FIG. 7, the UE 752 may locate the dominant path of the first layer of PDSCH by applying an IFFT to the DMRS received through the UE antenna which is chosen for the Pt layer by the base station. In the example of FIG. 7, the UE 752 may perform an FFT to extract DMRS in the received transmission, and then perform an IFFT on the extracted DMRS tones to obtain the channel impulse response of the precoded channel. The dominant path may be located by determining the strongest path in the channel impulse response of the precoded channel obtained at the UE antenna chosen by the base station for the layer.

At 1310, the UE may estimate the time support of the power delay profile from a dominant path of the receive layer. In an aspect, the UE may estimate the time support of the power delay profile from the dominant path of the receive layer. The UE may estimate the time support by aligning the center of the time support of the power delay profile with the dominant path. The UE may estimate the time support by using a value proportional to the delay spread for a propagation channel as the length of the time support of the precoded channel. In an aspect, the delay spread of the propagation channel may be estimated based on a received cell specific reference signal. In another aspect, the delay spread information may be received from a remote apparatus, and the time support may be estimated based on the received delay spread information.

At 1312, the UE may estimate the precoded channel based on the time support of the power delay profile. For example, referring to FIG. 7, the UE 752 may estimate the precoded channel based on the time support of its power delay profile. For example, to enable channel estimation of the per-tone precoded channels at the UE 752, the base station 702 may allocate to the UE 752 a group of resource blocks that are contiguous in the frequency domain (e.g., the resource blocks 306, 308). As described above the estimated precoded channel at the PDSCH tones may be estimated based on $Y_p$, the vector of DMRS tones after "descrambling," and the robust minimum mean-square error (RMMSE) channel estimator, W.

Figure 14:
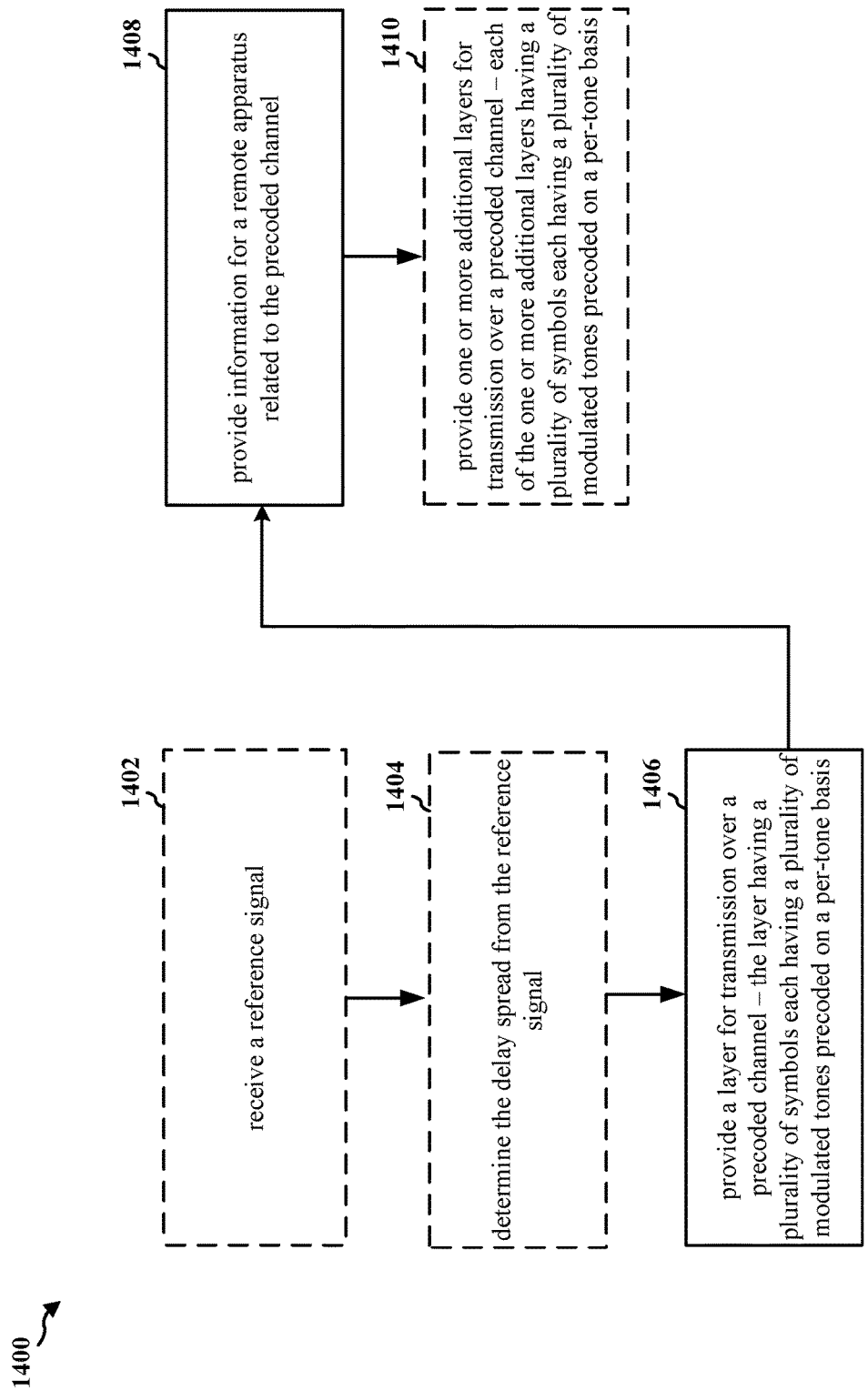
FIG. 14 is a flowchart of a method of wireless communication.

FIG. 14 is a flowchart 1400 of a method of wireless communication. The method may be performed by a base station (e.g., the base station 702, the apparatus 1702/1702'). At 1402, the base station may receive a reference signal. For example, referring to FIG. 7, the base station 702 may receive a SRS (the reference signal) from the UE 752.

At 1404, the base station may determine the delay spread from the reference signal. For example, referring to FIG. 7, the base station 702 may determine the delay spread of the precoded channel from the received SRS. In an aspect, the base station 702 may determine the delay spread of the precoded channel by applying precoding to the propagation channel estimated from the SRS in order to estimate the precoded channel, and by determining the power delay profile of the estimated precoded channel by time averaging the energy of the Channel Impulse Response (CIR) of the estimated precoded channel. (The CIR of the precoded channel may be obtained as follows. For each tone, the precoded channel matrix is estimated by left multiplying the precoding matrix by the propagation channel matrix estimated from SRS. Then, for each pair of a UE antenna and a layer, the corresponding symbols in the precoded channel matrices make up the frequency response of the precoded channel for the UE antenna and the layer pair. By applying IFFT to those symbols, the CIR of the precoded channel for the UE antenna and the layer pair is obtained).

At 1406, the base station may provide (or send) a layer for transmission over a precoded channel. The layer may have a plurality of symbols (e.g., OFDM symbols), and each symbol may have a plurality of modulated tones precoded on a per-tone basis. In an aspect, the layer may include a reference signal on one or more symbols. The reference signal may be specific to a remote apparatus. In another aspect, the base station may be configured to phase ramp compensate the precoded modulated tones. In another aspect, the base station may be configured to determine the first arriving path of a propagation channel based on the SRS and use the first arriving path for the phase compensation of the precoded modulated tones. For example, referring to FIG. 7, the base station may provide the first layer of the PDSCH for transmission over a precoded channel. The first layer may include OFDM symbols, each symbol having a number of modulated tones precoded on a per-tone basis. The first layer may include DMRS. In an aspect, the tones on the first layer may be phase ramped.

At 1408, the base station may provide (or send) information related to the precoded channel for a remote apparatus. In an aspect, the information may indicate that per-tone precoding is being applied to the layer. In another aspect, the information may identify which one of the antennas on the remote device to receive the reference signal for determining a time support for the power delay profile of the layer received by the remote apparatus. For example, referring to FIG. 7, the base station 702 may provide downlink control information via the PDCCH related to the precoded channel for the UE 752 (the remote apparatus). The downlink control information may indicate that per-tone precoding is being applied on the PDSCH and may indicate a specific antenna chosen for each layer of PDSCH. In an aspect, the downlink control information may indicate a delay spread of the precoded channel for each the layer.

At 1410, the base station may provide (or send) one or more additional layers for transmission over a precoded channel, and each of the one or more additional layers may have a plurality of symbols, each symbol having a plurality of modulated tones precoded on a per-tone basis. For example, referring to FIG. 7, the base station 702 may provide an additional layer of PDSCH, and the additional layer may have symbols that include modulated tones precoded on a per-tone basis.

Figure 15:
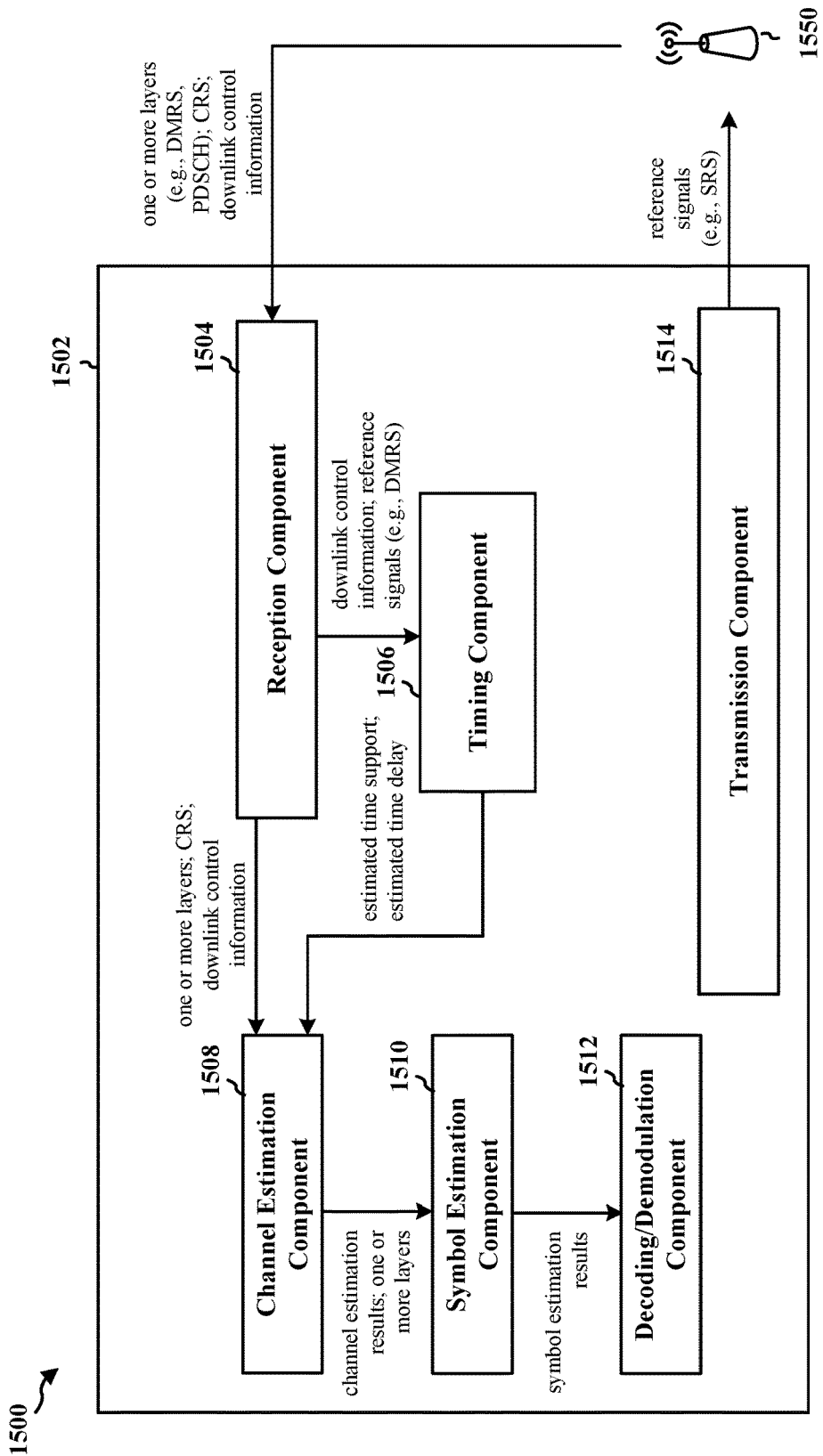
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE. The apparatus may include a reception component 1504, a timing component 1506, a channel estimation component 1508, a symbol estimation component 1510, a decoding/demodulation component 1512, and/or a transmission component 1514. The reception component 1504 may be configured to receive a transmission over a precoded channel. The transmission may include a layer having a number of symbols (e.g., OFDM symbols), and each symbol may have a number of modulated tones precoded on a per-tone basis. The receive layer may be associated with a power delay profile. The channel estimation component 1508 may be configured to estimate the precoded channel based on a time support of the power delay profile. In an aspect, the timing component

1506 may be configured to estimate the time support of the power delay profile from a dominant path of the receive layer. In an aspect, the transmission may include one or more additional layers, and each of the one or more additional layers may have a number of symbols, each symbol having a number of modulated tones precoded on a per-tone basis. In another aspect, the reception component 1504 may be configured to receive the transmission through a plurality of antennas. In another aspect, the layer may include a reference signal that may be on one or more of the symbols. In this aspect, the timing component 1506 may be configured to estimate the time support of the power delay profile from the reference signal received through one of the antennas. In another aspect, the reference signal may be an apparatus specific reference signal. In another configuration, the reception component 1504 may be configured to receive an indicator identifying one of the antennas through which the reference signal is received, wherein the reference signal is used to estimate the time support of the power delay profile. In another configuration, the channel estimation component 1508 and/or the timing component 1506 may be configured to locate a dominant path of the receive layer by applying an IFFT to the reference signal received through said one of the antennas and use the dominant path to estimate the time support of the power delay profile. In another configuration, the timing component 1506 and/or the channel estimation component 1508 may be configured to estimate the time support by aligning the center of the assumed time support of the power delay profile with the dominant path. In another configuration, the timing component 1506 and/or the channel estimation component 1508 may be configured to estimate the time support by using a value proportional to a delay spread for a propagation channel as a length of the time support of the precoded channel. In another configuration, the reception component 1504 may be configured to receive a cell specific reference signal. In this configuration, the timing component 1506 and/or the channel estimation component 1508 may be configured to estimate the delay spread for the propagation channel from the reference signal. In another configuration, the reception component 1504 may be configured to receive a delay spread of the precoded channel for the layer from a remote apparatus 1550. In this configuration, the timing component 1506 and/or the channel estimation component 1508 may be configured to estimate the time support using the delay spread of the precoded channel as the length of the time support of the precoded channel. In an aspect, the received precoded modulated tones (e.g., precoded on a per-tone basis) may be phase ramp compensated by the remote apparatus 1550. In this aspect, the channel estimation component 1508 and/or the timing component 1506 may be configured to use the dominant path to adjust a position of an FFT window of a receiver. The symbol estimation component 1510 may be configured to estimate the modulated symbols of the receive layer, and the decoding/demodulation component 1512 may be configured to decode and demodulate the receive layer to obtain the PDSCH, for example.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of the components in FIG. 15. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
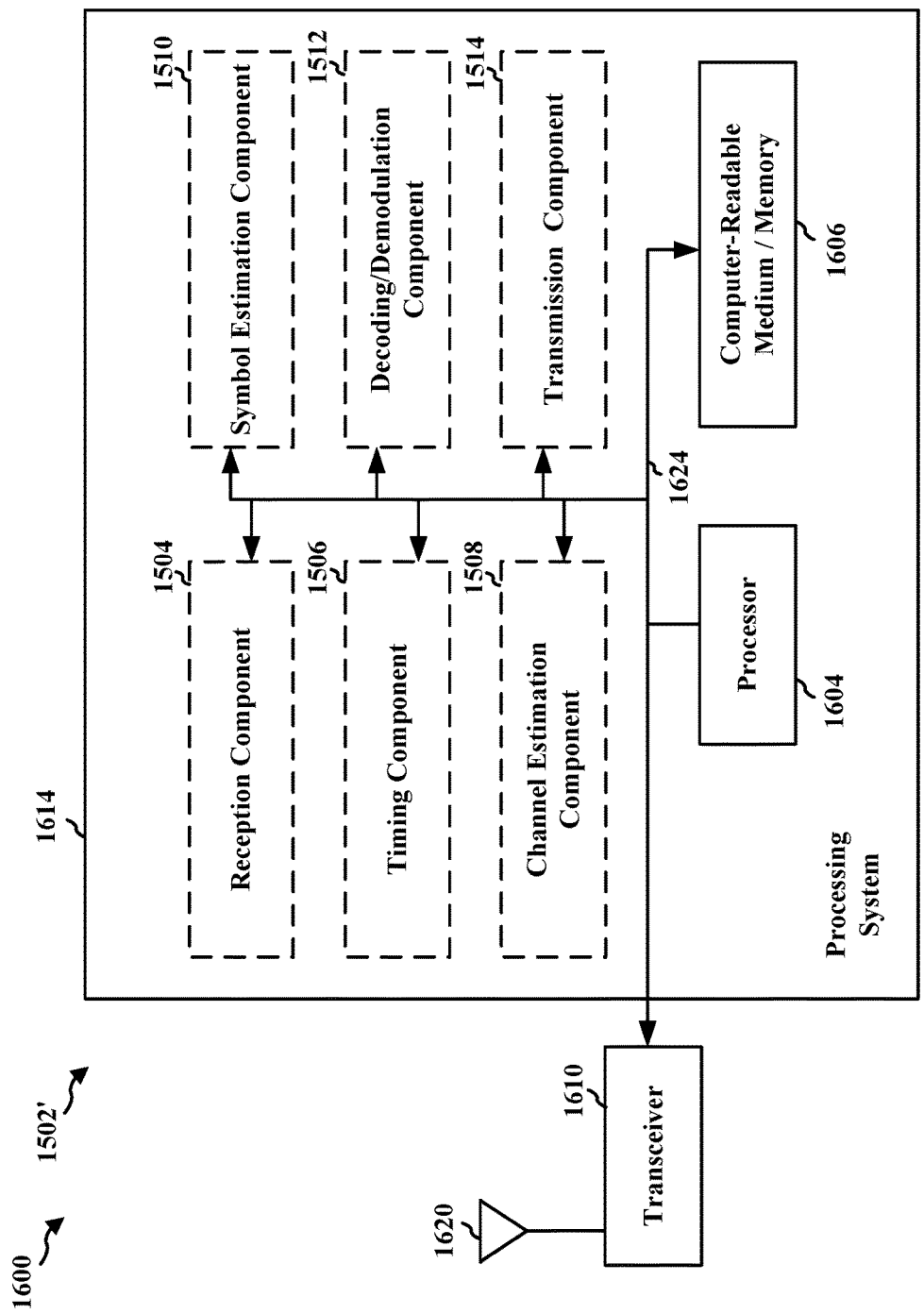
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1514, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer readable medium/memory 1606, one or more hardware components coupled to the processor 1604, or some combination thereof. The processing system 1614' may be a component of the UE 650 and may include the memory 660 and/or at least one of the TX processor 668, the RX processor 656, and the controller/processor 659.

In one configuration, the apparatus 1502/1502' for wireless communication includes means for receiving a transmission over a precoded channel. For example, the means for receiving may include the transceiver 1610, the reception component 1504, the processor 1604, the RX processor 656, and/or the receiver 654RX. The transmission may include a layer having a plurality of symbols, each symbol having a plurality of modulated tones precoded on a per-tone basis. The receive layer may be associated with a power delay profile. The apparatus includes means for estimating the precoded channel based on a time support of the power delay profile. For example, the means for estimating may include the processor 1604, the channel estimation component 1508, and/or the channel estimator 658. The means for estimating the precoded channel may be configured to determine an expected reference signal value (e.g., an expected modulation symbol used by the DMRS), compare the received reference signal value with the expected reference signal value, and determine properties of the precoded channel based on the comparison. In one configuration, the apparatus includes means for estimating the time support of the power delay profile from a dominant path of the receive layer. For example, the means for estimating the time support may include the processor 1604, the timing component 1506, the channel estimation component 1508, and/or the channel estimator 658. In another aspect, the transmission may include one or more additional layers, each of the one or more additional layers may have a plurality of symbols, each symbol having a plurality of modulated tones precoded on a per-tone basis. In another aspect, the transmission may be received through a plurality of antennas. In another aspect, the layer may include a reference signal on one or more of the symbols. In this aspect, the time support of the power delay profile may be estimated from the reference signal received through one of the antennas. In another aspect, the reference signal may be an apparatus specific reference signal. In another configuration, the apparatus may include means for receiving an indicator identifying said one of the antennas through which the reference signal is received, wherein the reference signal is used to estimate the time support of the power delay profile. For example, the means for receiving may include the transceiver 1610, the reception component 1504, the processor 1604, the RX processor 656, and/or the receiver 654RX. In another configuration, the means for estimating the time support may be configured to locate a dominant path of the receive layer by applying an IFFT to the reference signal received through said one of the antennas. In this configuration, the dominant path may be used to estimate the time support of the power delay profile. In another aspect, the time support may be estimated by aligning the center of the time support of the power delay profile with the dominant path. In another aspect, the time support may be estimated by using a value proportional to a delay spread for a propagation channel as a length of the time support of the precoded channel. In another configuration, the apparatus may include means for receiving a cell specific reference signal, and means for estimating the delay spread for the propagation channel from the reference signal. For example, the means for receiving may include the transceiver 1610, the reception component 1504, the processor 1604, the RX processor 656, and/or the receiver 654RX. The means for estimating the delay spread may include the processor 1604, timing component 1506, the channel estimation component 1508, and/or the channel estimator 658. In an aspect, the means for estimating the delay spread may be configured to determine a power delay profile of the received reference signal and determine the delay spread based on the power delay profile of the received reference signal. In another configuration, the apparatus may include means for receiving a delay spread of the precoded channel for the layer from a remote apparatus. For example, the means for receiving may include the transceiver 1610, the reception component 1504, the processor 1604, the RX processor 656, and/or the receiver 654RX. The time support may be estimated using the delay spread of the precoded channel as the length of the time support of the precoded channel. In another aspect, the received precoded modulated tones (e.g., precoded on a per-tone basis) may be phase ramp compensated by the remote apparatus, and a position of an FFT window of a receiver (e.g., in the reception component 1504) may be adjusted using the dominant path. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
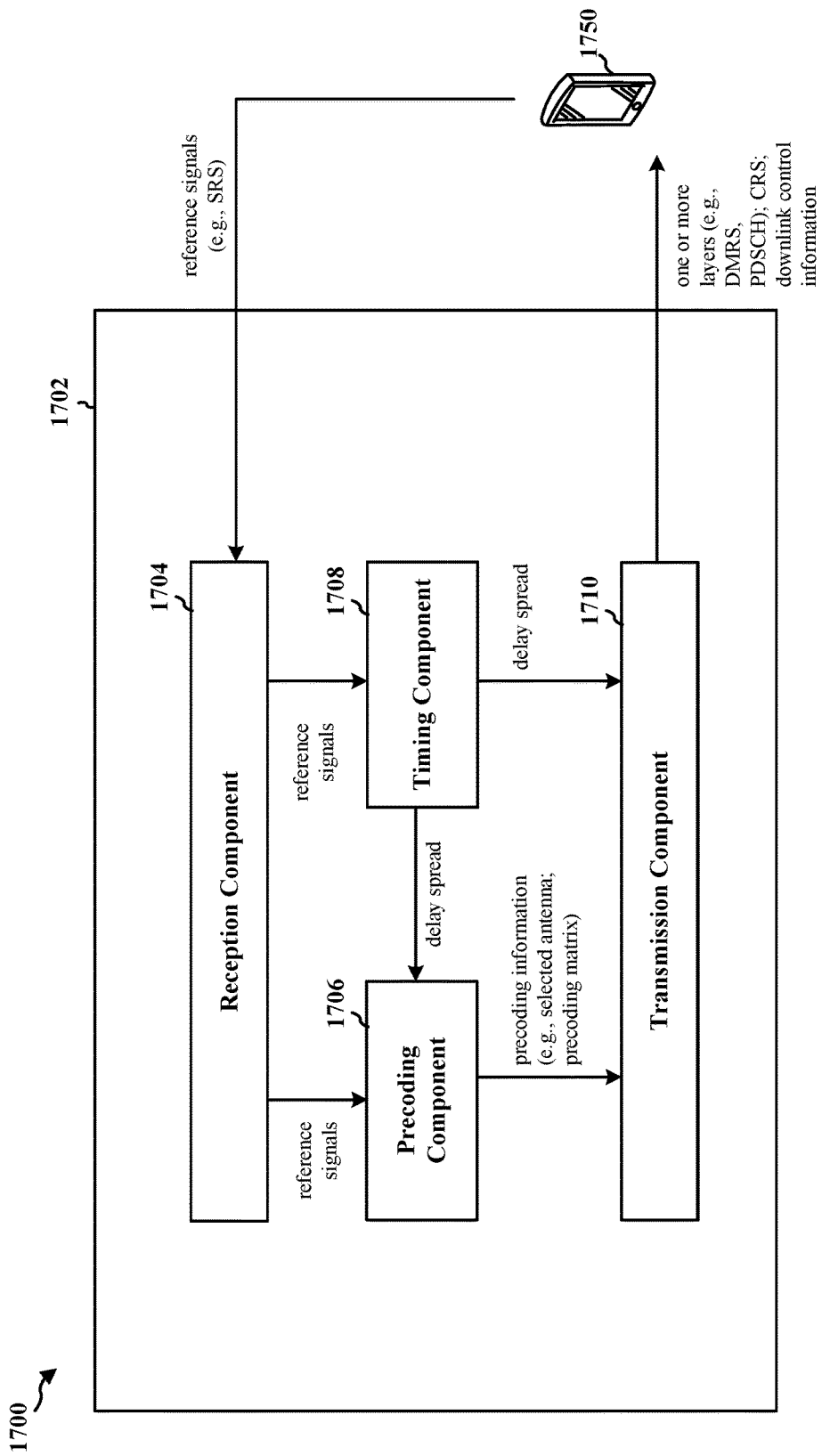
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be an base station. The apparatus may include a reception component 1704, a precoding component 1706, a timing component 1708, and a transmission component 1710. The precoding component 1706 and/or the transmission component 1710 may be configured to provide a layer for transmission over a precoded channel. The layer may have a number of symbols (e.g., OFDM symbols) each symbol having a plurality of modulated tones precoded on a per-tone basis. The precoding component 1706 and/or the transmission component 1710 may be configured to provide information for a remote apparatus 1750 related to the precoded channel. In an aspect, the precoding component 1706 and/or the transmission component 1710 may be configured to provide one or more additional layers for transmission over a precoded channel. Each of the one or more additional layers may have a plurality of symbols, and each symbol may have a plurality of modulated tones precoded on a per-tone basis. In another aspect, the information may include an indication that per-tone precoding is being applied to the layer. In another configuration, the precoding component 1706 and/or the transmission component 1710 may be configured to include in the layer a reference signal on one or more of the symbols. In an aspect, the remote apparatus may include a plurality of antennas, and the information may include an indicator identifying which one of the antennas to receive the reference signal for determining a time support for a power delay profile of the layer received by the remote apparatus 1750. In an aspect, the reference signal may be specific to the remote apparatus 1750. In another aspect, the information may include a delay spread of the precoded channel for the layer. In another configuration, the reception component 1704 may be configured to receive a reference signal and determine the delay spread of the precoded channel from the reference signal. In another configuration, the precoding component 1706 and/or the transmission component 1710 may be configured to phase ramp compensate the precoded modulated tones (e.g., precoded on a per-tone basis). In another configuration, the timing component 1708 may be configured to determine a first arriving path of a propagation channel and use the first arriving path for the phase compensation of the precoded modulated tones.

The apparatus may include additional components that perform each of the blocks of the algorithm in the aforementioned flowchart of FIG. 14. As such, each block in the aforementioned flowcharts of FIG. 14 may be performed by a component and the apparatus may include one or more of the components illustrated in FIG. 17. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
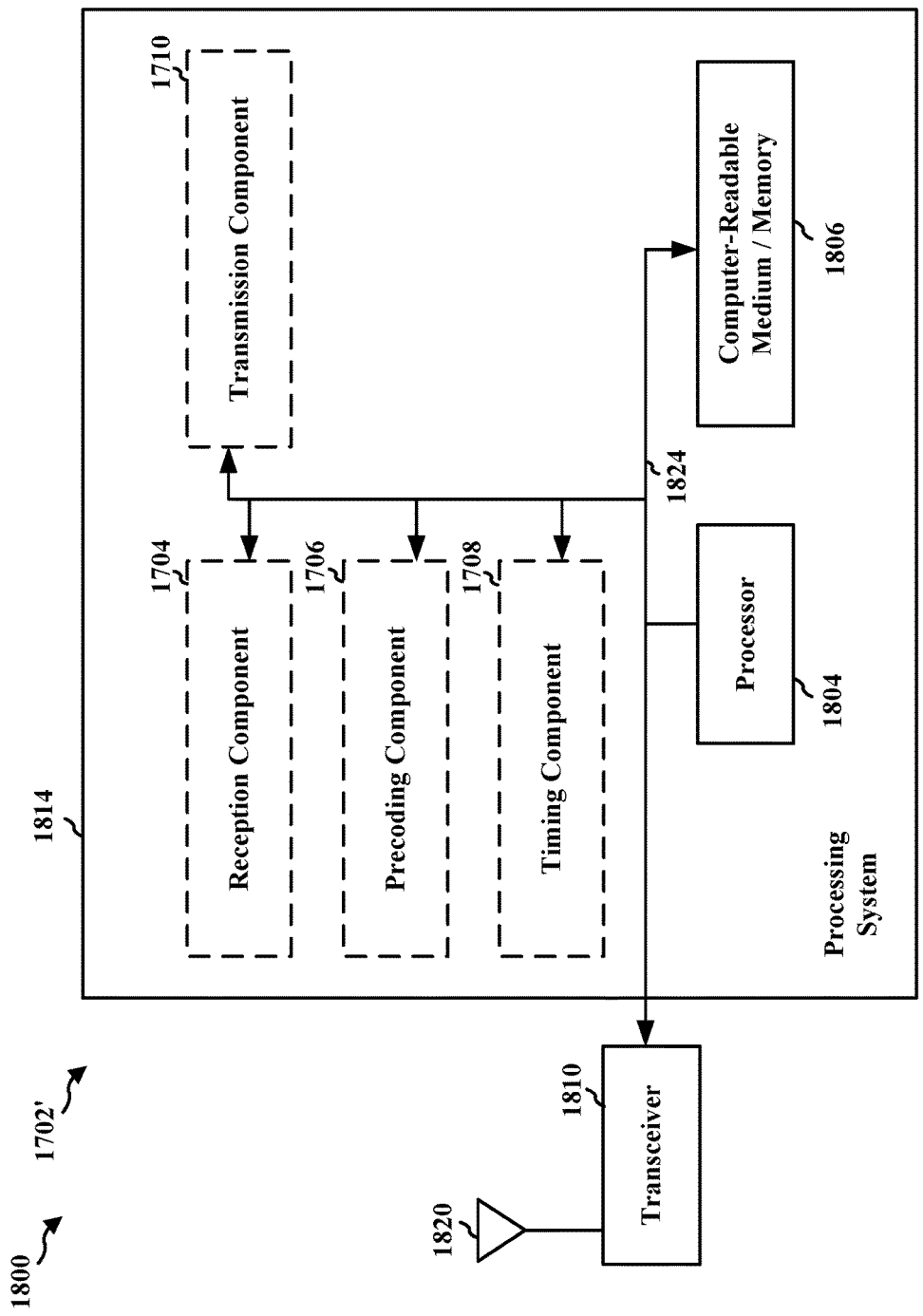
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the base station 610 and may include the memory 676 and/or at least one of the TX processor 616, the RX processor 670, and the controller/processor 675.

In one configuration, the apparatus 1702/1702' for wireless communication includes means for providing a layer for transmission over a precoded channel. For example, the means for providing may include the controller/processor 675, the TX processor 616, the precoding component 1706, and/or the transmission component 1710. The layer may have a plurality of symbols, each symbol having a plurality of modulated tones precoded on a per-tone basis. The apparatus includes means for providing information for a remote apparatus related to the precoded channel. For example, the means for providing may include the controller/processor 675, the TX processor 616, the precoding component 1706, and/or the transmission component 1710. In one configuration, the apparatus may include means for providing one or more additional layers for transmission over a precoded channel. For example, the means for providing may include the controller/processor 675, the TX processor 616, the precoding component 1706, and/or the transmission component 1710. Each of the one or more additional layers may have a plurality of symbols, each symbol having a plurality of modulated tones precoded on a per-tone basis. In an aspect, the information may include an indication that per-tone precoding is being applied to the layer. In another aspect, the layer may include a reference signal comprising one or more of the symbols. In another aspect, the remote apparatus may include a plurality of antennas, and the information may include an indicator identifying which one of the antennas to receive the reference signal for determining a time support for a power delay profile of the layer received by the remote apparatus. In another aspect, the reference signal may be specific to the remote apparatus. In another aspect, the information may include a delay spread of the precoded channel for the layer transmitted over the precoded channel. In another configuration, the apparatus may include means for receiving a reference signal and means for determining the delay spread of the precoded channel from the reference signal. For example, the means for receiving may include the transceiver 1810, the reception component 1704, the RX processor 670, and/or the controller/processor 675. In another example, the means for determining the delay spread may include the controller/processor 675 and/or the timing component 1708. In an aspect, the means for determining the delay spread may be configured to determine a power delay profile of the precoded channel based on the received reference signal and determining the delay spread based on the power delay profile of the estimated precoded channel. In another aspect, the precoded modulated tones (e.g., precoded on a per-tone basis) may be phase ramp compensated. In another configuration, the apparatus may include means for determining a first arriving path of a UL propagation channel, in which the phase compensation of the precoded modulated tones may be based on the determined first arriving path. For example, the means for determining may include the controller/processor 675 and/or the timing component 1708. In an aspect, the means for determining the first arriving path may be configured to determine a power delay profile associated with the propagation channel and determine a time of the first arriving path. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In an aspect, an apparatus for wireless communications may include a processing system configured to provide a layer for transmission over a precoded channel, the layer having a plurality of symbols, each symbol having a plurality of modulated tones precoded on a per-tone basis. The processor may be further configured to provide information for a remote apparatus related to the precoded channel.

In an aspect, the processing system is further configured to provide one or more additional layers for transmission over a precoded channel. Each of the one or more additional layers may have a plurality of symbols, each symbol having a plurality of modulated tones precoded on a per-tone basis.

In an aspect, the information includes an indication that per-tone precoding is being applied to the layer.

In an aspect, the processing system is further configured to include in the layer a reference signal comprising one or more of the symbols.

In an aspect, the remote apparatus includes a plurality of antennas. The information may include an indicator identifying which one of the antennas to receive the reference signal for determining a time support for a power delay profile of the layer received by the remote apparatus.

In an aspect, the reference signal may be specific to the remote apparatus.

In an aspect, the information includes a delay spread for the layer transmitted over the precoded channel.

In an aspect, the processing system may be further configured to receive a reference signal and determine the delay spread from the reference signal.

In an aspect, the processing system may be further configured to phase ramp compensate the precoded modulated tones (e.g., precoded on a per-tone basis).

In an aspect, the processing system may be further configured to determine a first arriving path of a propagation channel and use the first arriving path for a phase compensation of the precoded modulated tones.

In an aspect, a method of wireless communications may include providing a layer for transmission over a precoded channel, the layer having a plurality of symbols, each symbol having a plurality of modulated tones precoded on a per-tone basis. The method of wireless communication may also include providing information for a remote apparatus related to the precoded channel.

An aspect may further include providing one or more additional layers for transmission over a precoded channel. Each of the one or more additional layers may have a plurality of symbols, each symbol having a plurality of modulated tones precoded on a per-tone basis.

In an aspect, the information may include an indication that per-tone precoding is being applied to the layer.

In an aspect, the layer includes a reference signal comprising one or more of the symbols.

In an aspect, the remote apparatus includes a plurality of antennas. The information may include an indicator identifying which one of the antennas to receive the reference signal for determining a time support for a power delay profile of the layer received by the remote apparatus.

In an aspect, the reference signal may be specific to the remote apparatus.

In an aspect, information includes a delay spread for the layer transmitted over the precoded channel.

In an aspect, the method further includes receiving a reference signal and determining the delay spread from the reference signal.

In an aspect, the precoded modulated tones may be phase ramp compensated (e.g., precoded on a per-tone basis).

An aspect may further include determining a first arriving path of a propagation channel. A phase compensation of the precoded modulated tones may be based on the determined first arriving path.

In an aspect, an apparatus for wireless communications may include means for providing a layer for transmission over a precoded channel. The layer may have a plurality of symbols, each symbol having a plurality of modulated tones precoded on a per-tone basis. The apparatus for wireless communication may also include means for providing information for a remote apparatus related to the precoded channel.

An aspect further includes means for providing one or more additional layers for transmission over a precoded channel. Each of the one or more additional layers may have a plurality of symbols, each symbol having a plurality of modulated tones precoded on a per-tone basis.

In an aspect, the information may include an indication that per-tone precoding is being applied to the layer.

In an aspect, the layer includes a reference signal including one or more of the symbols.

In an aspect, the remote apparatus includes a plurality of antennas. Additionally, the information may include an indicator identifying which one of the antennas to receive the reference signal for determining a time support for a power delay profile of the layer received by the remote apparatus.

In an aspect, the reference signal may be specific to the remote apparatus.

In an aspect, the information may include a delay spread for the layer transmitted over the precoded channel.

An aspect may further include means for receiving a reference signal and means for determining the delay spread from the reference signal.

In an aspect, the precoded modulated tones may be phase ramp compensated (e.g., precoded on a per-tone basis).

An aspect may further include means for determining a first arriving path of a propagation channel. A phase compensation of the precoded modulated tones may be based on the determined first arriving path.

In an aspect, a computer-readable medium stores computer executable code. The code may include code to provide a layer for transmission over a precoded channel. The layer may have a plurality of symbols, each symbol having a plurality of modulated tones precoded on a per-tone basis. The code may include code to provide information for a remote apparatus related to the precoded channel.

In an aspect, a transmission may be received through a plurality of antennas.

In an aspect, a layer further includes a reference signal comprising one or more of the symbols, and wherein the time support of the power delay profile is estimated from the reference signal received through one of the antennas.

In an aspect, the reference signal may include an apparatus specific reference signal.

In an aspect, an apparatus further includes means for receiving an indicator identifying said one of the antennas through which the reference signal is received, wherein the reference signal is used to estimate the time support of the power delay profile.

In an aspect, the means for estimating the time support may be configured to locate a dominant path of the receive layer by applying an IFFT to the reference signal received through said one of the antennas. The dominant path may be used to estimate the time support of the power delay profile.

In an aspect, the time support is estimated by aligning a center of the time support of the power delay profile with the dominant path.

In an aspect, the time support is estimated by using a value proportional to a delay spread for a propagation channel as a length of the time support of the precoded channel.

In an aspect, an apparatus further includes means for receiving a cell specific reference signal and means for estimating the delay spread for the propagation channel from the cell specific reference signal.

In an aspect, an apparatus further includes means for receiving a delay spread for the layer from a remote apparatus, wherein the time support is estimated using the delay spread as a length of the time support of the precoded channel.

In an aspect, the received precoded modulated tones (e.g., precoded on a per-tone basis) may be phase ramp compensated, and wherein a position of an FFT window of a receiver is adjusted using the dominant path.

No claim element is to be construed under the provisions of 35 U.S.C. § 112(f) unless the element is expressly recited using the phrase "means for" or, in the case of a method claim, the element is recited using the phrase "step for."

It is understood that the specific order or hierarchy of blocks in the processes/flowcharts disclosed is an illustration of exemplary approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for wireless communications, comprising:
    a processing system configured to:
        receive, through a plurality of antennas, a transmission over a precoded channel, the transmission comprising a layer having a plurality of symbols, each symbol having a plurality of modulated tones precoded on a per-tone basis, the layer comprising a reference signal comprising one or more of the plurality of symbols and being associated with a power delay profile;
        estimate a time support of the power delay profile from the reference signal received through one of the plurality of antennas; and
        estimate the precoded channel based on the time support of the power delay profile.

2. The apparatus of claim 1, wherein the processing system is further configured to estimate the time support of the power delay profile from a dominant path of the layer.

3. The apparatus of claim 1, wherein the transmission further comprises an additional layer, the additional layer having a second plurality of symbols, each symbol having a second plurality of modulated tones precoded on a per-tone basis.

4. The apparatus of claim 1, wherein the reference signal comprises an apparatus specific reference signal.

5. The apparatus of claim 1, wherein the processing system is further configured to receive an indicator identifying said one of the plurality of antennas through which the reference signal is received, wherein the reference signal is used to estimate the time support of the power delay profile.

6. The apparatus of claim 1, wherein the processing system is further configured to locate a dominant path of the layer by applying an IFFT to the reference signal received through said one of the plurality of antennas and the processing system is further configured to estimate the time support of the power delay profile using the dominant path.

7. The apparatus of claim 2, wherein the processing system is further configured to estimate the time support by aligning a center of the time support of the power delay profile with the dominant path.

8. The apparatus of claim 7, wherein the processing system is further configured to estimate the time support by using a value proportional to a delay spread for a propagation channel as a length of the time support of the precoded channel.

9. The apparatus of claim 8, wherein the processing system is further configured to receive a cell specific reference signal and estimate the delay spread for the propagation channel from the cell specific reference signal.

10. The apparatus of claim 7, wherein the processing system is further configured to receive a delay spread for the layer from a remote apparatus and estimate the time support using the delay spread as a length of the time support of the precoded channel.

11. The apparatus of claim 2, wherein at least one of the plurality of modulated tones precoded on a per-tone basis are phase ramp compensated, and wherein the processing system is further configured to use the dominant path to adjust a position of an FFT window of a receiver.

12. A method of wireless communications, comprising:
    receiving, through a plurality of antennas, a transmission over a precoded channel, the transmission comprising a layer having a plurality of symbols, each symbol having a plurality of modulated tones precoded on a per-tone basis, the layer comprising a reference signal comprising one or more of the plurality of symbols and being associated with a power delay profile;
    estimating a time support of the power delay profile from the reference signal received through one of the plurality of antennas; and
    estimating the precoded channel based on the time support of the power delay profile.

13. The method of claim 12, further comprising estimating the time support of the power delay profile from a dominant path of the layer.

14. The method of claim 12, wherein the transmission further comprises one or more additional layers, each of the one or more additional layers having a plurality of symbols, each symbol having a plurality of modulated tones precoded on a per-tone basis.

15. The method of claim 12, wherein the reference signal comprises an apparatus specific reference signal.

16. The method of claim 12, further comprising receiving an indicator identifying said one of the plurality of antennas through which the reference signal is received and estimating the time support of the power delay profile using the reference signal.

17. The method of claim 12, further comprising locating a dominant path of the layer by applying an IFFT to the reference signal received through said one of the plurality of antennas, wherein estimating the time support of the power delay profile comprises using the dominant path.

18. The method of claim 13, further comprising estimating the time support by aligning a center of the time support of the power delay profile with the dominant path.

19. The method of claim 18, further comprising estimating the time support by using a value proportional to a delay spread for a propagation channel as a length of the time support of the precoded channel.

20. The method of claim 19, further comprising:
receiving a cell specific reference signal; and
estimating the delay spread for the propagation channel from the cell specific reference signal.

21. The method of claim 18, further comprising receiving a delay spread for the layer from a remote apparatus and estimating the time support using the delay spread as a length of the time support of the precoded channel.

22. The method of claim 13, wherein the plurality of modulated tones precoded on a per-tone basis are phase ramp compensated, the method further comprising using the dominant path to adjust a position of an FFT window of a receiver.

23. An apparatus for wireless communications, comprising:
means for receiving, through a plurality of antennas, a transmission over a precoded channel, the transmission comprising a layer having a plurality of symbols, each symbol having a plurality of modulated tones precoded on a per-tone basis, the layer comprising a reference signal comprising one or more of the plurality of symbols and being associated with a power delay profile;
means for estimating a time support of the power delay profile from the reference signal received through one of the plurality of antennas; and
means for estimating the precoded channel based on the time support of the power delay profile.

24. The apparatus of claim 23, further comprising means for estimating the time support of the power delay profile from a dominant path of the layer.

25. The apparatus of claim 23, wherein the transmission further comprises one or more additional layers, each of the one or more additional layers having a plurality of symbols, each symbol having a plurality of modulated tones precoded on a per-tone basis.

26. A non-transitory computer-readable medium storing computer executable code, comprising code that when executed by a processor cause the processor to be configured to:
receive, through a plurality of antennas, a transmission over a precoded channel, the transmission comprising a layer having a plurality of symbols, each symbol having a plurality of modulated tones precoded on a per-tone basis, the layer comprising a reference signal comprising one or more of the plurality of symbols and being associated with a power delay profile;
estimate a time support of the power delay profile from the reference signal received through one of the plurality of antennas; and
estimate the precoded channel based on the time support of the power delay profile.

* * * * *